United States Patent
Srinivasan et al.

(10) Patent No.: US 10,182,105 B2
(45) Date of Patent: *Jan. 15, 2019

(54) POLICY BASED FRAMEWORK FOR APPLICATION MANAGEMENT IN A NETWORK DEVICE HAVING MULTIPLE PACKET-PROCESSING NODES

(71) Applicant: Juniper Networks, Inc., Sunnyvale, CA (US)

(72) Inventors: Pramod Srinivasan, San Jose, CA (US); Ramesh Rajan, San Jose, CA (US); David M. Katz, Santa Cruz, CA (US); Robert Stephen Rodgers, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 14/867,325

(22) Filed: Sep. 28, 2015

(65) Prior Publication Data

US 2016/0191613 A1    Jun. 30, 2016

Related U.S. Application Data

(63) Continuation-in-part of application No. 14/587,612, filed on Dec. 31, 2014.

(Continued)

(51) Int. Cl.
*G06F 15/16* (2006.01)
*H04L 29/08* (2006.01)
(Continued)

(52) U.S. Cl.
CPC ............ *H04L 67/10* (2013.01); *G06F 9/4843* (2013.01); *H04L 41/082* (2013.01); *H04L 67/00* (2013.01); *H04L 67/1008* (2013.01); *H04L 69/00* (2013.01)

(58) Field of Classification Search
CPC ...... G06F 9/5072; G06F 11/3006; G06F 8/61; G06F 8/65; G06F 11/1482; G06F 21/00;
(Continued)

(56) References Cited

U.S. PATENT DOCUMENTS

| | | | | |
|---|---|---|---|---|
| 5,657,320 A | * | 8/1997 | Russ | ...................... H04L 45/00 340/2.9 |
| 7,392,421 B1 | * | 6/2008 | Bloomstein | ......... G06F 11/1482 714/4.4 |

(Continued)

FOREIGN PATENT DOCUMENTS

EP    1793542 A2    6/2007

OTHER PUBLICATIONS

Response to Final Office Action dated Jun. 2, 2017, from U.S. Appl. No. 14/587,612, filed Jul. 28, 2017, 17 pp.

(Continued)

*Primary Examiner* — Dustin Nguyen
(74) *Attorney, Agent, or Firm* — Shumaker & Sieffert, P.A.

(57) ABSTRACT

A first system manager operating on a first node of a distributed routing system, receives data indicating a current state of the distributed routing system. The first system manager may determine, based at least in part on the current state of the distributed routing system and a set of rules for an application, an updated state of the distributed routing system. Furthermore, the first node may send the updated state of the distributed routing system to a second node of the distributed routing system. Responsive to receiving the updated state of the distributed routing system, a second system manager on the second node may modify a state of the second node. Modifying the state of the second node may comprise at least one of: starting the application on the (Continued)

second node, stopping the application on the second node, or modifying a state of the application on the second node.

25 Claims, 10 Drawing Sheets

Related U.S. Application Data

(60) Provisional application No. 62/155,782, filed on May 1, 2015.

(51) Int. Cl.
*H04L 12/24* (2006.01)
*H04L 29/06* (2006.01)
*G06F 9/48* (2006.01)

(58) Field of Classification Search
CPC ....... H04L 41/042; H04L 45/00; H04L 63/20; H04L 69/40; H04L 41/0816; H04L 41/082; H04W 40/248
USPC .......................................... 709/220
See application file for complete search history.

(56) References Cited

U.S. PATENT DOCUMENTS

| | | | | |
|---|---|---|---|---|
| 8,589,727 | B1* | 11/2013 | Fletcher | G06F 11/3006 714/13 |
| 2001/0042139 | A1 | 11/2001 | Jeffords et al. | |
| 2005/0005200 | A1* | 1/2005 | Matena | G06F 9/5072 714/38.13 |
| 2005/0177572 | A1* | 8/2005 | Verma | H04L 69/40 |
| 2005/0198275 | A1 | 9/2005 | D'alo et al. | |
| 2006/0036606 | A1 | 2/2006 | Hildebrand et al. | |
| 2006/0173857 | A1 | 8/2006 | Jackson | |
| 2007/0168919 | A1* | 7/2007 | Henseler | G06F 8/61 717/101 |
| 2007/0233698 | A1 | 10/2007 | Sundar et al. | |
| 2010/0281473 | A1* | 11/2010 | Zhang | G06F 8/65 717/171 |
| 2012/0271926 | A1* | 10/2012 | Shakirzyanov | G06F 9/5072 709/220 |
| 2013/0159374 | A1 | 6/2013 | Steiner et al. | |
| 2013/0159550 | A1* | 6/2013 | Vasseur | H04W 40/248 709/242 |
| 2014/0137187 | A1* | 5/2014 | Kumar | G06F 21/00 726/3 |
| 2015/0082378 | A1* | 3/2015 | Collison | H04L 63/20 726/1 |
| 2016/0277488 | A1* | 9/2016 | Fallon | H04L 41/042 |

OTHER PUBLICATIONS

Office Action from U.S. Appl. No. 14/587,612, dated Nov. 18, 2016, 12 pp.
Search Report from counterpart European Application No. 15202032.7, dated Mar. 21, 2016, 7 pp.
Final Office Action from U.S. Appl. No. 14/587,612, dated Jun. 2, 2017, 13 pp.
Advisory Action from U.S. Appl. No. 14/587,612, dated Aug. 16, 2017, 3 pp.
Office Action from U.S. Appl. 14/587,612, dated Oct. 5, 2017, 12 pp.
Examination Report from counterpart European Application No. 15202032.7, dated Aug. 25, 2017, 3 pp.
Response filed Jan. 4, 2018 to the Examination Report from counterpart European Application No. 15202032.7, dated Aug. 25, 2017, 14 pp.
Response filed Jan. 4, 2018 to the Office Action dated Oct. 5, 2017 in U.S. Appl. No. 14/587,612, 19 pp.
Intent to Grant dated Apr. 26, 2018, from counterpart European Application No. 15202032.7, 60 pp.
Office Action from U.S. Appl. No. 14/587,612, dated May 3, 2018, 14 pp.
Response filed Aug. 3, 2018 to the Office Action from U.S. Appl. No. 14/587,612, dated May 3, 2018, 19 pp.
"A Guide to Creating Higher-Level Constructs with ZooKeeper," Hadoop, ZooKeeper Recipes and Solutions, retrieved from internet http://zookeeper.apache.org/doc/trunk/recipes.html#sc_leaderElection, Oct. 2014, 8 pp.
U.S. Appl. No. 14/587,612, filed Dec. 31, 2014 entitled Policy Based Framework for Application Management in Distributed System.

* cited by examiner

POLICY BASED FRAMEWORK FOR APPLICATION MANAGEMENT IN A NETWORK DEVICE HAVING MULTIPLE PACKET-PROCESSING NODES

This application is a continuation-in-part of U.S. patent application Ser. No. 14/587,612, filed Dec. 31, 2014, and claims the benefit of U.S. Provisional Patent Application 62/155,782, filed May 1, 2015, the entire content of each of which is incorporated herein by reference.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Service providers, such as Internet service providers, must meet increasing bandwidth demands. This requires service providers to continuously add, replace and upgrade routing equipment within their networks. Equipment replacement and upgrades can be a challenge for service providers. As networks expand, administrative time and costs required to manage routing equipment also increase. As a result, service providers continuously seek to reduce time and expense associated upgrading and managing network routing systems.

One way to meet increasing bandwidth needs is to use distributed routing systems, such as multi-chassis routers, in which multiple routing devices are physically coupled and configured to operate as a single routing node. Because distributed routing systems combine resources of multiple routing devices, distributed routing systems have much higher bandwidth capabilities than standalone routers. For example, the use of distributed routing systems can simplify and improve routing on a service provider network by consolidating routing functions onto fewer routers. However, the individual configuration and management of each device of a distributed routing system can be a significant challenge.

SUMMARY

This disclosure describes a network device, such as a multi-chassis router, having a plurality of chassis coupled to the plurality of chassis by communication links. Each of the chassis, also referred to as "nodes," provides an operating environment of execution of applications associated with processing of packets by the network device. For example, each chassis may include a control plane having one or more processors and a data plane that may include line cards, high-speed packet forwarding circuits and interconnecting switch fabric. In this way, the network device may internally operate as a distributed computing environment having complex, heterogeneous computing components for processing packets, yet may externally appear to operate like a single network device within a network.

Techniques are described herein that allow a policy-based framework to be implemented for controlling the functional operation of applications across the heterogeneous computing environments of the packet-processing nodes of the network device. As described herein, the techniques facilitate control over mobility and failover for applications across chassis of the router (i.e., inter-node) or between computing environments within the same chassis, such as between the control plane and the forwarding plane of a routing chassis. A policy description language (DSL) is described herein that allows an administrator to describe and specify each packet-processing application, including its properties and resource requirements, using a command line or programmatic interface. Responsive to the DSL, the management framework executing on the various internal nodes of the network device control invocation and execution of packet-processing application in accordance with policies specified by the DSL. In this way, the functional configuration of the packet applications controlling processing within each of the chassis of the multi-chassis network device, and the components within each of the chassis, may readily be controlled and configured using an extensible, generalized policy-driven framework.

In accordance with one or more techniques of this disclosure, a first system manager operating on a first node of the network device receives data indicating a current state of the network device. The first system manager may determine, based at least in part on the current state of the network device and a set of rules for an application, an updated state of the network device. Furthermore, the first node may send the updated state of the network device to a second node of the network device. Responsive to receiving the updated state of the network device, a second system manager on the second node may modify a state of the second node. Modifying the state of the second node may comprise at least one of: starting the application on the second node, stopping the application on the second node, or modifying a state of the application on the second node.

In one example, this disclosure describes a method comprising: receiving, by a first system manager operating on a first node of a network device that includes a plurality of nodes, data indicating a current state of the network device; determining, by the first system manager, based at least in part on the current state of the network device and a set of rules for an application, an updated state of the network device; sending, by the first node, updated state data to a second node of the network device, the updated state data indicating at least a portion of the updated state of the network device, the first and second nodes being different ones of the plurality of nodes included in the network device; and responsive to receiving the updated state data, modifying, by a second system manager on the second node, a state of the second node to conform to the updated state of the network device, wherein modifying the state of the second node comprises at least one of: starting the application on the second node, stopping the application on the second node, or modifying a state of the application on the second node.

In another example, this disclosure describes a network device comprising: a first node and a second node, the first node comprising a first system manager and the second node comprising a second system manager, wherein the first system manager is configured to: receive data indicating a current state of the network device; determine, based at least in part on the current state of the network device and a set of rules for an application, an updated state of the network device; and send updated state data to a second node of the network device, the updated state data indicating at least a portion of the updated state of the network device, the first and second nodes being different ones of the plurality of nodes included in the network device; and wherein the second system manager is configured to: responsive to receiving the updated state data, modify a state of the second node to conform to the updated state of the network device, wherein modifying the state of the second node comprises at least one of: starting the application on the second node, stopping the application on the second node, or modifying a state of the application on the second node.

In another example, this disclosure describes a computer program product comprising one or more non-transitory computer-readable data storage media having instructions stored thereon, wherein the instructions, when executed, configure a first node of a network device to: receive, by a first system manager operating on the first node, data indicating a current state of the network device; determine, by the first system manager, based at least in part on the current state of the network device and a set of rules for an application, an updated state of the network device; and send updated state data to a second node of the network device, the updated state data indicating at least a portion of the updated state of the network device, the first and second nodes being different ones of the plurality of nodes included in the network device; and wherein the instructions, when executed, configure a second system manager operating on the second node to: responsive to receiving the updated state data, modify a state of the second node to conform to the updated state of the network device, wherein modifying the state of the second node comprises at least one of: starting the application on the second node, stopping the application on the second node, or modifying a state of the application on the second node.

In one example, this disclosure describes a method comprising: receiving, by a first system manager operating on a first node of a distributed routing system that includes a plurality of nodes, data indicating a current state of the distributed routing system; determining, by the first system manager, based at least in part on the current state of the distributed routing system and a set of rules for an application, an updated state of the distributed routing system; sending, by the first node, updated state data to a second node of the distributed routing system, the updated state data indicating at least a portion of the updated state of the distributed routing system, the first and second nodes being different ones of the plurality of nodes included in the distributed routing system; and responsive to receiving the updated state data, modifying, by a second system manager on the second node, a state of the second node to conform to the updated state of the distributed routing system, wherein modifying the state of the second node comprises at least one of: starting the application on the second node, stopping the application on the second node, or modifying a state of the application on the second node.

In another example, this disclosure describes a distributed routing system comprising: a first node and a second node, the first node comprising a first system manager and the second node comprising a second system manager, wherein the first system manager is configured to: receive data indicating a current state of the distributed routing system; determine, based at least in part on the current state of the distributed routing system and a set of rules for an application, an updated state of the distributed routing system; and send updated state data to a second node of the distributed routing system, the updated state data indicating at least a portion of the updated state of the distributed routing system, the first and second nodes being different ones of the plurality of nodes included in the distributed routing system; and wherein the second system manager is configured to: responsive to receiving the updated state data, modify a state of the second node to conform to the updated state of the distributed routing system, wherein modifying the state of the second node comprises at least one of: starting the application on the second node, stopping the application on the second node, or modifying a state of the application on the second node.

In another example, this disclosure describes a computer program product comprising one or more non-transitory computer-readable data storage media having instructions stored thereon, wherein the instructions, when executed, configure a first node of a distributed routing system to: receive, by a first system manager operating on the first node, data indicating a current state of the distributed routing system; determine, by the first system manager, based at least in part on the current state of the distributed routing system and a set of rules for an application, an updated state of the distributed routing system; and send updated state data to a second node of the distributed routing system, the updated state data indicating at least a portion of the updated state of the distributed routing system, the first and second nodes being different ones of the plurality of nodes included in the distributed routing system; and wherein the instructions, when executed, configure a second system manager operating on the second node to: responsive to receiving the updated state data, modify a state of the second node to conform to the updated state of the distributed routing system, wherein modifying the state of the second node comprises at least one of: starting the application on the second node, stopping the application on the second node, or modifying a state of the application on the second node.

One or more examples are set forth in the accompanying drawings and the description below. Other features, objects, and advantages will be apparent from the description, drawings, and claims.

DETAILED DESCRIPTION

A distributed computing system, such as a distributed routing system, comprises a plurality of nodes. Each of the nodes may be a separate physical or virtual network element. Applications may run on each of the nodes. The disclosure describes techniques for controlling deployments of applications on nodes of a distributed computing system. The techniques of this disclosure may improve the functioning of a control system that controls deployments of applications by using respective sets of rules for respective particular applications. Furthermore, particular techniques of this disclosure may improve the software architecture of the control system in order to improve the ability to upgrade components of the control system. Additional techniques of this disclosure may improve the stability and/or scalability of the distributed computing system and may enable the self-organization of the distributed computing system.

For example, in accordance with one example technique of this disclosure, a first system manager operates on a first node of a distributed computing system that includes a plurality of nodes. In this example, the first system manager may receive data indicating a current state of the distributed computing system. Additionally, the first system manager may determine, based at least in part on the current state of the distributed computing system and a set of rules for an application, an updated state of the distributed computing system (i.e. a desired state of the distributed computing system). Furthermore, the first node may send updated state data to a second node of the distributed computing system. The updated state data may indicate at least a portion of the updated state of the distributed computing system. A second system manager may operate on a second node of the distributed computing system. Responsive to receiving the updated state data, the second system manager may modify a state of the second node to conform to the updated state of the distributed computing system. For instance, the second system manager may start the application on the second node, stop the application on the second node, and/or modify a state of the application on the second node.

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not necessarily intended to indicate the presence of particular numbers of the elements. In this disclosure, elements having names that start with ordinal words (e.g., "first," "second," "third," and so on) do not necessarily imply that the elements have a particular order. Rather, such ordinal words may merely be used to refer to different elements of a same or similar type.

Figure 1:
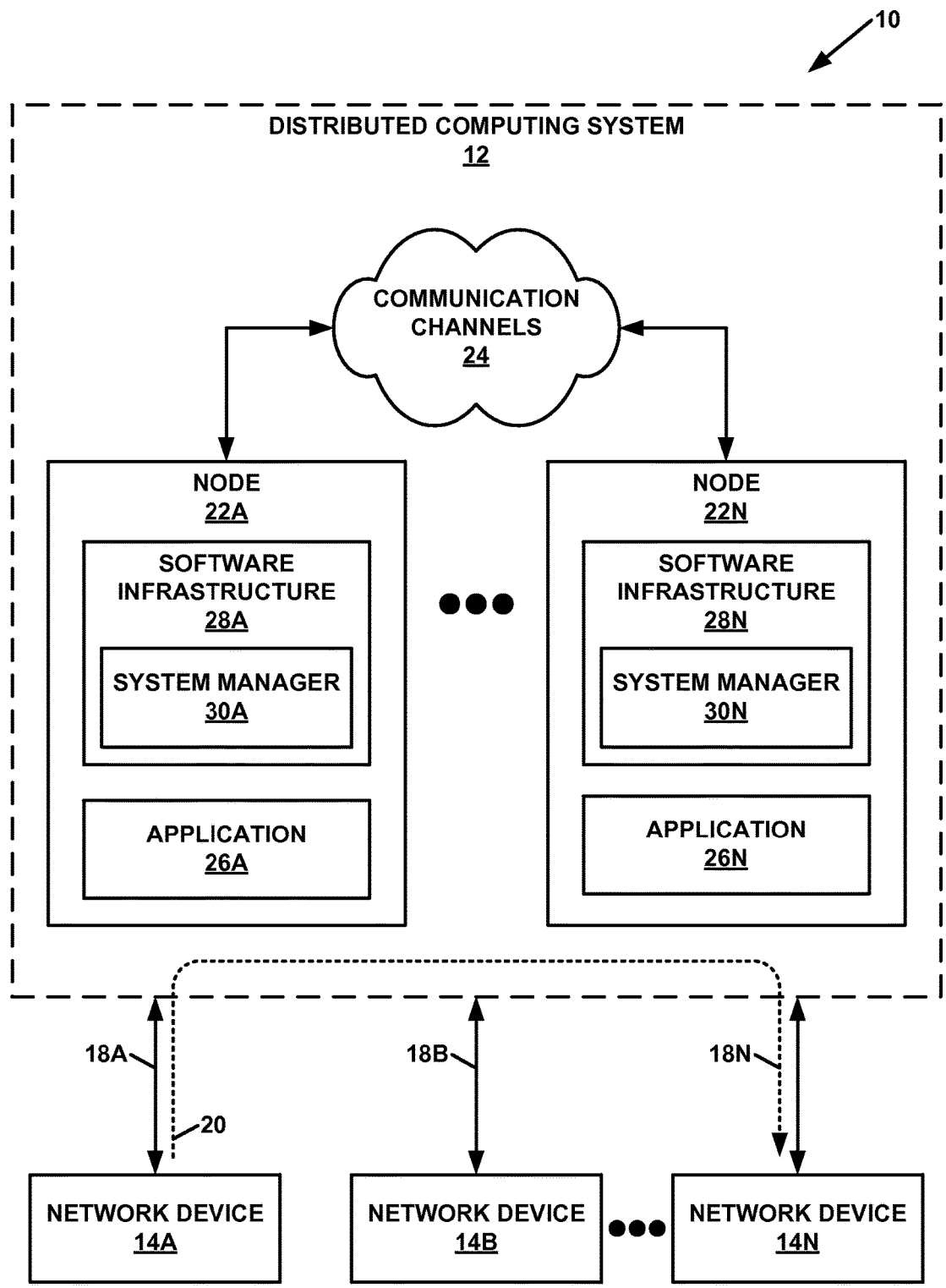
FIG. 1 is a block diagram illustrating an example network system, in accordance with one or more techniques of this disclosure.

FIG. 1 is a block diagram illustrating an example network system 10. In this example, network system 10 comprises a distributed computing system 12 coupled to network devices 14A-14N (collectively, "network devices 14"). Other example network systems may include additional networks, network devices, and systems. Each of network devices 14 may be implemented as one or more computing devices may be capable of communicating with other computing devices of a network. Network devices 14 may include various types of computing devices. For example, network devices 14 may include personal computers, tablet computers, smart phones, game consoles, in-car computers, gaming devices, point-of-sale devices, routers, switches, hubs, firewalls, server computers, supercomputers, mainframe computers, and other types of devices. In some examples where distributed computing system 12 comprises a distributed routing system, the distributed routing system may comprise routers, switches, hubs, firewalls, and other types of networking devices.

Connections 18A-18N (collectively, "connections 18") are links that communicatively couple network devices 14 to distributed computing system 12. In other words, network devices 14 can communicate with distributed computing system 12 via connections 18. Connections 18 may be implemented in various ways. For example, one or more of connections 18 may be implemented as an optical fiber, a coaxial cable, an RJ45 connector, or another type of optical or electrical communications medium. In other examples, one or more of connections 18 may include a communications network, such as the Internet, a wide area network, a local area network, and so on. In some examples, one or more of connections 18 may include wireless communication channels.

In some examples, distributed computing system 12 includes a distributed routing system. In some examples, a distributed routing system is implemented as a multi-chassis router. Furthermore, in some examples, distributed routing systems implemented other technologies, such as software defined networking (SDN). The following portions of this disclosure assume that distributed computing system 12 implements a distributed routing system. A distributed routing system is a system comprising a set of nodes configured to act as a single router to route communication units on a network. However, it will be understood that the techniques of this disclosure are not necessarily limited to distributed computing systems that include distributed routing systems. For example, distributed computing system 12 may include a cluster of computing devices that perform calculations for scientific or business purposes.

In examples where distributed computing system 12 implements a distributed routing system, distributed computing system 12 may receive flows of network traffic from network devices 14. Such flows of network traffic may include packets, frames, cells, or other communication units. Each flow of network traffic may originate at one of network devices 14 and may be destined for a different one of network devices 14. Upon receiving data in a flow of network traffic, distributed computing system 12 may apply one or more services to the flow of network traffic. For example, distributed computing system 12 may determine how to forward the data in the flow of network traffic. In other words, in this example, distributed computing system 12 routes the flow of network traffic. For instance, in the example of FIG. 1, distributed computing system 12 receives a flow 20 of network traffic that originates at network device 14A. In this example, distributed computing system 12 may, upon receiving data in flow 20, make the determination to forward the data to network device 14N. In another example, upon receiving data in a flow of network traffic, distributed computing system 12 may scan the data for malware, such as computer viruses.

In this example, distributed computing system 12 includes a plurality of nodes 22A-22N (collectively, "nodes 22"). Each of nodes 22 may be a physical or virtual machine. This disclosure may also refer to a node as a "container." Nodes 22 may communicate with each other via one or more communication channels 24. Communication channels 24 may implement a control plane that links nodes 22. Communication channels 24 may be multipoint or point-to-point. One or more of nodes 22 may receive flows of network traffic. The flows of network traffic may then be forwarded among nodes 22 before ultimately being output by one or more of nodes 22. Nodes 22 may include various types of computing devices or specialized hardware.

In the example of FIG. 1, nodes 22 may perform various functions of distributed computing system 12. For example, one or more of nodes 22 may perform malware detection services, intrusion detection services, denial of service attack detection services, network firewall services, traffic prioritization functions, media distribution services, and so on. In additional examples, nodes 22 may provide services such as tunneling, virtual private networks, caching, application proxies, and content delivery network (CDN) services to incoming packets. Service providers may utilize nodes 22 to provide content-specific services designed to improve the quality of a user's experience, for example, video streaming.

Applications 26A-26N (collectively, "applications 26") operate (e.g., execute, run) on nodes 22. In other words, nodes 22 host applications 26. Applications 26 may configure or cause nodes 22 to perform various functions of distributed computing system 12. For example, an application operating on one of nodes 22 may configure the node to perform malware detection functions. In another example, an application operating on one of nodes 22 may comprise a UNIX daemon. In another example, an application operating on one or nodes 22 may provide a forwarding component (e.g., a packet forwarding engine (PFE)) and/or a routing component (e.g., a Routing Engine (RE)). In some examples, applications operating on nodes 22 may form parts of a distributed application. For instance, in examples where distributed computing system 12 implements a distributed routing system, the combination of routing protocol daemon and the collection of PFE route handlers can be considered a distributed application.

Each of applications 26 may be implemented as one or more software programs comprising sets of computer-executable instructions. For instance, an application may be, or may comprise, a process (e.g., a Linux process). In some examples, applications 26 may be developed by third parties, such as independent software development entities. Because applications 26 may be developed by third parties, the functionality of distributed computing system 12 may be extended and modified in ways that are useful to the particular party deploying distributed computing system 12. In some examples, applications 26 are developed using a software development kit (SDK). The example of FIG. 1 shows only a single application operating on each of nodes 22. However, in other examples, one or more of nodes 22 may operate multiple applications or no applications. In some examples, applications 26 operate in virtual machines on nodes 22.

In this way, nodes 22 may provide an operating environment for execution of applications 26. Nodes 22 may be referred to as a services complex, and may include service cards, external blade servers, or one or more external servers built with off-the-shelf components, e.g., general purpose hardware. Nodes 22 may be a local cluster of compute nodes that provide an operating environment for application software. As another example, nodes 22 may be intermediate network devices, personal computers, server computers, mainframe computers, or other types of computing devices.

Additionally, each of nodes 22A-22N provides a respective software infrastructure 28A-28N (collectively, "software infrastructure 28"). The software infrastructure provides a communications substrate for applications 26 and provides systems for coordinating actions of distributed computing system 12. In at least some examples, the software infrastructure of a node includes no application-specific code. Because the software infrastructure does not include any application-specific code, the software infrastructure may be distributed in binary (e.g., compiled) form.

In some examples, the software infrastructure of each of nodes 22 is the same. Thus, the software infrastructure of each of nodes 22 may provide a uniform programming environment for applications 26. Accordingly, hardware limitations aside, any application designed to run in distributed computing system 12 can run on any node of distributed computing system 12. As a result, the location (i.e., node) at which an application operates may be unimportant.

The software infrastructure of each respective one of nodes 22 includes a respective system manager 30A-30N (collectively, "system managers 30"). System managers 30 may communicate with one another to elect one of system managers 30 as the "master" system manager. System managers 30 may elect the master system manager without human intervention. The automatic election of the master system manager is one aspect of how distributed computing system 12 may organize itself.

One or more of the unelected system managers serve as "satellite" system managers. In general, there is only one master system manager in distributed computing system 12, but there may be multiple satellite system managers. When a satellite system manager starts, the satellite system manager informs the master system manager of its presence in distributed computing system 12.

Applications 26 may publish state data. The state data published by an application represents an aspect of a state of the application. For example, the state data published by an application may indicate that the application is running on a particular node of distributed computing system 12. In another example, the state data published by an application may indicate whether the application is running as a primary or backup instance. In another example, an application implements a PFE. In this example, the state data published by the application may include a current state of a forwarding table used by the PFE to forward packets.

In addition, various components of the software infrastructure of nodes 22 may publish state data. For instance, system managers 30 may publish state data indicating states of applications operating on nodes 22. Additionally, system managers 30 may publish state data indicating the resources of nodes 22. For instance, system managers 30 may publish node resource data for nodes 22. The node resource data for a node may comprise information regarding the computing resources of the nodes. For instance, the node resource data for a node may indicate one or more of current central processing unit (CPU) utilization for the node, memory usage for the node, available memory for the node, and so on.

The master system manager receives the published state data, such as state data published by applications 26, system managers 30, and so on. Because the published state data indicates a current, and therefore changing, state of distributed computing system 12, this disclosure may refer to the published state data as the dynamic state data. In addition to receiving the dynamic state data, the master system manager receives sets of configuration rules (i.e., rule sets) for applications 26. The rules may conform to a policy description language. The master system manager determines, based at least in part on the state data and the sets of configuration rules, an updated state of distributed computing system 12. For instance, the master system manager may generate updated state data indicating the updated state of distributed computing system 12. The updated state of distributed computing system 12 may comprise an updated state of each of nodes 22 of distributed computing system 12. If a current state of a node running the master system manager (i.e., the "master node") differs from an updated state of the master node, the master system manager modifies the state of the master node such that the master node has the updated state of the master node.

Additionally, the master system manager publishes updated state data. The updated state data indicate the updated state of distributed computing system 12. The satellite system managers receive the updated state data published by the master system manager. For each respective satellite system manager, the respective satellite system manager adapts the actual state of a node corresponding to the respective satellite system manager (i.e., a "satellite node") to the updated state. In other words, a satellite system manager may respond to the updated system state by moving the state of its local host to match the updated state.

For example, a particular application may not be operating on a particular node (e.g., the master node or a satellite node). In this example, when the updated state of distributed computing system 12 indicates that the particular application is to be operating on the particular node, the system manager for the particular node causes the particular application to start operating on the particular node. In a similar example, a particular application may be operating on a particular node. In this example, the updated state of the particular node may indicate that the particular application is not operating on the particular node. Accordingly, in this example, the system manager for the particular node causes the particular application to stop operating on the particular node. In this way, by determining the updated state, updating the state of the master node, and publishing the updated state data, the master node may effectively move applications from one node to another as needed for failure recovery, load balancing, in-service software upgrades (ISSU), or other reasons.

Figure 2:
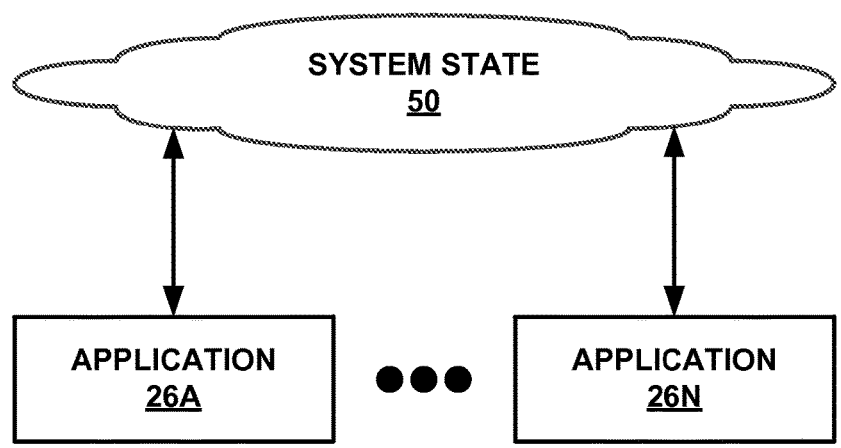
FIG. 2 is a conceptual diagram illustrating an example of publishing system state, in accordance with one or more techniques of this disclosure.

FIG. 2 is a conceptual diagram illustrating an example of publishing system state, in accordance with one or more techniques of this disclosure. As previously mentioned, applications 26 may publish their current states. Conceptually, applications 26 publish their current states to a system state cloud 50. System state cloud 50 persistently maintains the states of applications 26 even if applications 26 fail. For example, if a particular application publishes its state to system state cloud 50 and then fails, system state cloud 50 continues to store the state of the particular application. If a new instance of the particular application starts after a previous instance of the particular application fails, the new instance of the particular application may retrieve the state of the particular application from system state cloud 50 and may continue from the state of the previous instance of the particular application. Other examples of this disclosure do not use system state cloud 50 and do not use a publish/subscribe system for communication of application state.

Figure 3:
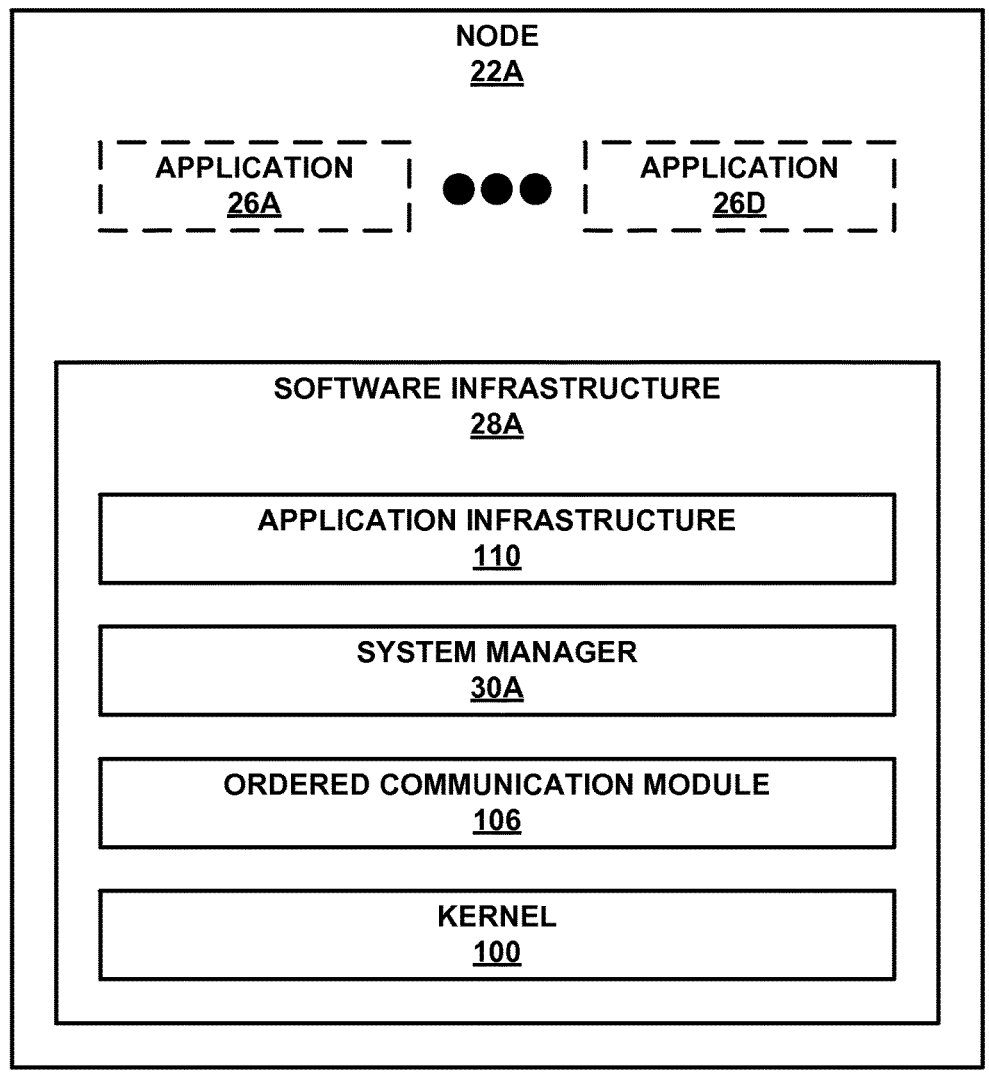
FIG. 3 is a block diagram illustrating an example software stack of a node of the distributed computing system, in accordance with one or more techniques of this disclosure.

FIG. 3 is a block diagram illustrating an example software stack of node 12A of distributed computing system 12, in accordance with one or more techniques of this disclosure. Although the example of FIG. 3 illustrates an example software stack of node 12A, each other one of nodes 22 may run the same software stack. However, different ones of nodes 22 may run the same or different applications. In the example of FIG. 3, software infrastructure 28A of node 12A includes a kernel 100, an ordered communication module 106, system manager 30A, and an application infrastructure 110. In other examples, software infrastructure 28A may include more, fewer, or different components.

Kernel 100 may manage input/output requests from software, and may translate the input/output requests into data processing instructions for the central processing unit and other electronic components of a computer. In some examples, kernel 100 may comprise a stock Unix kernel.

Ordered communication module 106 provides an inter-process communication bus. In some examples, ordered communication module 106 comprises ZOOKEEPER™ software provided by the Apache Software Foundation. Ordered communication module 106 may be asynchronous (i.e., guaranteeing only eventual message delivery without ordering).

As previously indicated, system manager 30A is responsible for launching, coordinating, and monitoring of applications. As shown in the example of FIG. 3, system manager 30A is separate from kernel 100. If system manager 30A is the master system manager, system manager 30A may determine the placement of applications on particular ones of nodes 22. Furthermore, if system manager 30A is the master system manager, system manager 30A may communicate with satellite system managers to implement decisions regarding the placement of applications on particular ones of nodes 22. Regardless of whether system manager 30A is the master system manager or a satellite system manager, system manager 30A may detect failures of applications running on node 22A. Application infrastructure 110 helps to make applications as simple as possible. Application infrastructure 110 may be provided library routines.

Figure 4:
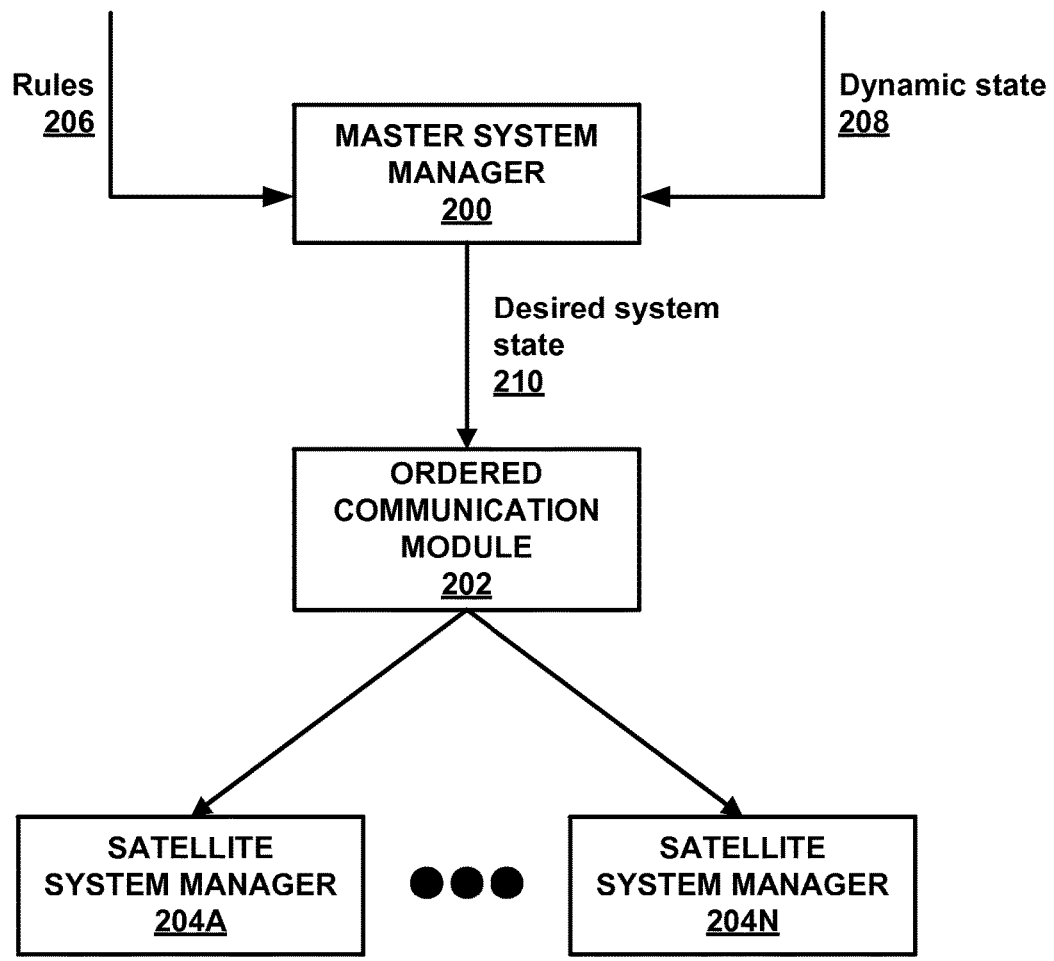
FIG. 4 is a block diagram illustrating an example data flow for a master system manager, an ordered communication module, and a plurality of satellite system managers, in accordance with one or more techniques of this disclosure.

FIG. 4 is a block diagram illustrating an example data flow for a master system manager 200, an ordered communication module 202, and a plurality of satellite system managers 204A-204N (collectively, "satellite system managers 204"), in accordance with one or more techniques of this disclosure. Master system manager 200 and each of satellite system managers 204 may be different ones of system managers 30 of FIG. 1, for example. Ordered communication module 202 may operate in a manner similar to ordered communication module 106 (FIG. 3).

In the example of FIG. 4, master system manager 200 receives rules 206 and dynamic state 208. Although not shown in the example of FIG. 4, master system manager 200 may receive dynamic state 208 from satellite system managers 204 and/or applications hosted by nodes 22. Master system manager 200 determines, based on rules 206 and dynamic state 208, an updated system state 210 of distributed computing system 12. Master system manager 200 outputs updated system state 210 to ordered communication module 202. Ordered communication module 202 communicates updated system state 210 to satellite system managers 204. Responsive to receiving updated system state 210, satellite system managers 204 perform various actions to conform the states of nodes on which satellite system managers 204 operate to updated system state 210. Additionally, master system manager 200 may perform various actions to conform a state of a node on which master system manager 200 operates to conform to updated system state 210.

As indicated above, master system manager 200 receives dynamic state 208. Master system manager 200 may receive dynamic state 208 in the form of messages published by other components (e.g., applications, system managers, etc.) of distributed computing system 12. Dynamic state 208 may include information about various aspects of the current state of distributed computing system 12. For example, dynamic state 208 may include information regarding the CPU and memory utilization of nodes 22 of distributed computing system 12. Furthermore, dynamic state 208 may include information indicating the states of applications 26 operating on nodes 22 of distributed computing system 12. In some examples, an application may be in one of an initialized state, a ready state, an upgrade prepare state, an admin stopped state, an exit state, or a failed state. The exit state may occur when the application exits due to some reason. When an application exits (i.e., is in or enters the exit state), the application is not running and/or is not responsive. The failed state may occur when the application is stopped due to repeated failures of the application. In another example, the application may be in one of an active state, a standby state, a dead state, or a ready-to-go-active state. In this example, the dead state may correspond to a failed state.

In addition to receiving data indicating the updated state of distributed computing system 12 and adapting the actual state of a node accordingly, a satellite system manager for a node may collect information about applications hosted on the node and information about resources of the node. For example, a satellite system manager for a node may collect information regarding host memory of the node, CPU usage of the node, Input/Output of the node, interrupts, and so on. The satellite system manager may include the collected information in the dynamic state of distributed computing system 12. The master system manager may determine the updated state of distributed computing system 12 based at least in part on the collected information.

Furthermore, as indicated above, master system manager 200 receives rules 206. In some examples, the rules include a respective rule set for respective applications configured to run on nodes of distributed computing system 12 (e.g., applications 26). In some examples, master system manager 200 compiles the rule sets prior to using the rule sets in a rule engine. An example rule engine is described with regard to FIG. 5, below. In other examples, master system manager 200 receives compiled rule sets. In general, compiling a rule set transforms the rule set, which is written in a source language, into another language (i.e., the target language). In some examples, the rule sets are represented as a configuration file in the Lua scripting language or other policy description language. In other examples, the rule sets are not compiled. In some examples, master system manager 200 receives rules 206 at run time (i.e., after master system manager 200 is initialized and is running). In some examples, master system manager 200 receives rules 206 statically (i.e., when master system manager 200 is initialized).

Although the example of FIG. 4 shows only master system manager 200 receiving rules 206, each system manager of distributed computing system 12 may receive rules 206, including satellite system managers 204. Satellite system managers 204 typically do not use rules 206, but storing rules 206 may enable one or more of satellite system managers 204 to act as a standby master system manager that is capable of assuming the role of master system manager if master system manager 200 fails. If both the original master system manager and the standby master system manager fail, distributed computing system 12 may elect a new master system manager.

The rule set for an application may specify a group of applications to which the application belongs. Additionally, the rule set for the application may specify a leader application in the group of applications. If the rule set specifies a leader application in the group of applications, distributed computing system 12 runs all applications of the group of applications on the same node. The rule set for an application may also specify a path of a binary of the application. The binary of the application includes executable code of the application. Furthermore, the rule set for the application may indicate a version of the application. The rule set for the application may also specify a path of a log file for the application. Additionally, the rule set for the application may specify a parameter string comprising parameters to be passed to the application. The rule set for the application may specify a working directory for the application. The working directory for the application may be a directory at which the application stores working data. Furthermore, the rule set for the application may specify a description of the application.

Additionally, the rule set for an application may include one or more rules used for determining updated system state 210 responsive to receiving dynamic state data indicating a failure of the application. For instance, the rule set for the application may include one or more of:

A rule indicating whether to restart the application responsive to the application exiting.

A rule indicating whether to restart the node responsive to the application exiting.

A rule indicating a list of one or more applications to restart responsive to the application exiting.

A rules indicating another application to execute responsive to the application exiting.

A rule indicating number of times to restart the application in response to the application exiting.

A time interval during which a particular number of times the application has to restart before determining that the application has entered a failed state.

Furthermore, master system manager 200 may determine, based on dynamic state 208, that an application has entered a failed state or dynamic state 208 may indicate that the application has entered the failed state. The rule set for the application may include one or more rules to perform responsive to the application entering the failed state (i.e., upon a failure of the application). For instance, the rule set for the application may include one or more of:

A rule indicating whether to restart the application in response to a failure of the application.

A rule indicating whether to restart the node responsive to a failure of the application.

A rule indicating another application to execute responsive to a failure of the application.

A rule indicating an alarm to raise responsive to a failure of the application.

The following indicates an example syntax of a rule set of an application. In some examples, the rule sets for each respective application operating in distributed computing system 12 conforms to the following syntax.

use <include.app>
// group applications

-continued

```
app-group <group_name> {
    // if leader is specified, all the members of the group are run on the
    // same node as the leader and will have the same role as the leader.
    leader <app_name>;
}
// global unique app_name, do we need namespace?
app app_name {
    meta {
        // the path of the binary.
        binpath bin_name;
        // the version of the app
        version version_file;
        // This will specify where the logfile for this app will be.
        // There will be a default location/path for all logfiles such
        // as /var/log/app-name.
        logfile log_file;
        // parameters to be passed to the application.
        params param_str;
        // Default is /usr/sbin/;
        working-dir work_dir;
        // Default is app-name
        description app_description;
    }
    // Defines how to handle App failures.
    app-failure {
        // what should be done if the application has stopped due to
        repeated failures?
        on-failure {
            // The alarm to rise when the app stops, Default is none.
            alarm {
                color name_of_color;
                id value;
            }
            // if specified, this app restart will cause the node to restart.
            restart node;
            // restart applications in a group
            restart <group_name> [local];
            // execute an application on failure
            exec exec_str;
        }
        // action performed when this application exits
        on-exit {
            // restart the application, default is restart enable
            restart disable;
            // if specified, this app restart will cause the node to restart.
            restart node;
            // if specified, this app restart will cause a restart of all apps
            which are
            // specified local indicates apps belonging to the group
            running on
            // local node.
            restart <group_name> [local];
            // execute an application on exit
            exec exec_str;
        }
        // This property defines how many times should the app
        // be restarted in place in a 'app-restarts-interval'
        // time interval. Default is 5.
        app-restarts app_num_restarts;
        // The time in seconds for the n restarts to occur
        // within. Default is 10.
        app-restarts-interval app_restarts_interval;
    }
    // where should the app run? (there can be runtime additions)
    resource {
        // node properties, on absence of this section, app can run on all
        // kinds of nodes
        node {
            // attributes of the node
            with-attribute attr_name;
        }
        // how many instances of the application?
        instances {
            // all nodes that match the criteria, default is false all-nodes;
            // Maximum number of instances to be started of this
            // particular app in the whole system. Default is 1.
            max-num-of-instances num_of_instances;
            // maximum number of instances that can be started in a
            // node, Default is 1.
            max-num-of-instances-per-node
            num_of_instances_per_node;
        }
        // App started at system boot, default is enable;
        startup-disable;
    }
    // application group it belongs to, app can belong to multiple groups
    app-group <group_name>;
    // how should the app should be upgraded?
    upgrade {
        // update method for app
        method sequential, parallel;
        // start this application after app listed
        // the dependee app has to be "ready" for the dependent to be
        started
        // "all" indicates all instances of the dependee have to be ready.
        start-after <app-name> [all] ;
        // start this application after group listed the dependee app has to
        be "ready"
        // for the dependent to be started local indicates apps belonging
        to the
        // group running on local node.
        start-after-group <group_name> [local];
        // stop this application after app listed the dependee app has to
        exit (offline)
        // for the dependent to be stopped
        stop-after <app-name> [all] ;
        // stop this application after group listed the dependee app has to
        exit (offline)
        // for the dependent to be stopped local indicates apps belonging
        to the group
        // running on local node.
        stop-after-group <group_name> [local];
        // Want an upgrade notfication for supporting ISSU? prep -
        prepare for issu
        // message done - completion of ISSU message
        notify prep, node-upgrade-done, system-upgrade-done;
        // Want an upgrade notification before an app gets upgraded.
        // System will wait for this app to acknowledge the pre-upgrade
        notification
        // before the app listed is upgraded.
        notify-pre-app-upgrade <app_name1>, <app_name2>;
        // weight of the app, the nodes with lower app weights (sum of
        weights of
        // all apps running on the node) is preferred for upgrade over
        nodes which
        // have higher value. If weight is specified and the apps has
        active and
        // standby components, the active component is heavier than
        standby by 1.
        // default is 0.
        weight weight_val;
    }
}
```

In the example syntax shown above, the rule set includes a set of metadata (i.e., meta) rules, a set of application failure (i.e., app-failure) rules, a set of resource rules, and a set of upgrade rules. The rule set may also include one or more rules not included in these sets.

The set of metadata rules includes a "binpath" rule, a "version" rule, a "logfile" rule, a "params" rule, a "working-dir" rule, and a "description" rule. The "binpath" rule specifies a path of a binary file for the application. The binary file for the application may include executable code for the application. The path for the binary file may indicate a storage location of the binary file for the application. The "version" rule specifies a version of the application. The "logfile" rule specifies a path for a log file for the application. The log file for the application may include a record of events generated by the application. The "params" rule may specify parameters provided to the application. The "working-dir" rule specifies a path to a working directory for the application. The application may store application data in the working directory for the application. The "description"

rule may specify a description of the application, such as a name of the application. The description may comprise human-readable data.

The set of application failure rules includes an "app-restarts" rule, an "app-restarts-interval" rule, a set on-failure rules, and a set of on-exit rules. The "app-restarts" rule specifies a number of times the application is to be restarted on a node prior to the application being considered to have entered a failed state. The "app-restarts-interval" rule specifies a time interval during which the application must be restarted the number of times specified by the "app-restarts" rule for the application to be considered to have entered the failed state. For example, the "app-restarts" rule may specify 5 and the "app-restarts-interval" rule may specify 10. In this example, if the application has restarted 5 times within 10 seconds, the application may be considered to have entered the failed state.

The set of on-failure rules include rules governing how master system manager 200 is to determine the updated state of distributed computing system 12 in the event that the application transitions to a failed state. Thus, the rule set of the application may include one or more rules for determining the updated state of the distributed computing system responsive to a failure of the application, wherein a failure of the application occurs when the application has stopped due to the application exiting a particular number of times within a given time interval. The application may enter the failed state if the application has stopped due to repeated failures of the application. For instance, the set of on-failure rules includes a set of alarm rules that indicate what master system manager 200 is to do if the application has entered the failed state. The set of alarm rules may include a "color" rule and an "id" rule. The "color" rule may indicate a color (e.g., red, yellow, green, etc.) indicative of a severity of a failure of the application. The "id" rule may specify an identifier of the alert. A user may be able to determine, based on the identifier of the alert, that the application has failed.

Thus, when master system manager 200 is determining the updated state of distributed computing system 12, master system manager 200 may determine, based on a first rule in the set of the rules for the application and based on the current state of distributed computing system 12 indicating the failure of the application, whether the application is restarted in the updated state of distributed computing system 12. Furthermore, master system manager 200 may determine, based on a second rule in the set of rules for the application and based on the current state of distributed computing system 12 indicating the failure of the application, whether a node on which the application was operating is restarted in the updated state of distributed computing system 12. Additionally, master system manager 200 may determine, based on a third rule in the set of rules for the application and based on the current state of distributed computing system 12 indicating the failure of the application, whether another application is executed in the updated state of distributed computing system 12. Master system manager 200 may also determine, based on a fourth rule in the set of rules for the application and based on the current state of distributed computing system 12 indicating the failure of the application, whether an alarm is raised in the updated state of distributed computing system 12.

Furthermore, the set of on-failure rules may include a restart node rule, a restart application group rule, and an application execution rule. The restart node rule specifies whether to restart a node on which the application was operating in response to the application entering the failed state. The restart application group rule specifies a group of applications to restart in response to the application entering the failed state. The application execution rule specifies a particular application to execute in response to the application entering the failed state. The particular application may be the application corresponding to the rule set or a different application.

As indicated above, the set of application failure rules may include a set of on-exit rules. In other words, the rule set for the application may include one or more rules for determining the updated state of distributed computing system 12 responsive to the application exiting. The set of on-exit rules may include a restart disable rule, a restart node rule, a restart application group name, and an application execution rule. The restart disable rule specifies whether to restart the application in response to the application entering the exit state. The restart node rule specifies whether to restart a node on which the application was operating in response to the application entering the exit state. The restart application group rule specifies a group of applications to restart in response to the application entering the exit state. The application execution rule specifies a particular application to execute in response to the application entering the exit state. The particular application may be the application corresponding to the rule set or a different application.

Thus, when master system manager 200 is determining the updated state of distributed computing system 12, master system manager 200 may determine, based on a first rule in the set of rules for the application and based on the current state of distributed computing system 12 indicating that the application has exited, whether the application is restarted in the updated state of distributed computing system 12. Additionally, master system manager 200 may determine, based on a second rule in the set of rules for the application and based on the current state of distributed computing system 12 indicating that the application has exited, whether a node on which the application is operating is restarted in the updated state of distributed computing system 12. Furthermore, master system manager 200 may determine, based on a third rule in the set of rules for the application and based on the current state of distributed computing system 12 indicating that the application has exited, a list of one or more applications that are restarted in the updated state of distributed computing system 12. Master system manager 200 may determine, based on a fourth rule in the set of rules for the application and based on the current state of distributed computing system 12 indicating that the application has exited, whether a second application is executed in the updated state of distributed computing system 12. Furthermore, master system manager 200 may determine, based on a fifth rule in the set of rules for the application, a rule indicating a number of times to restart the application in response to the application exiting. Master system manager 200 may determine, based on a sixth rule in the set of rules for the application, a time interval during which a particular number of times the application has to restart before determining that the application has entered a failed state.

Furthermore, as indicated above, the rule set for the application may include a set of resource rules. The master system manager may use the set of resource rules to determine whether to start the application on a particular node of distributed computing system 12. In the example syntax shown above, the set of resource rules may include a set of node attribute rules, a set of instances rules, and a startup-disable rule. The set of node attribute rules may specify attributes of nodes on which the application can run. For example, the attributes may include minimum memory (e.g., Random Access Memory (RAM)), minimum hard disk space, minimum CPU resources, I/O capabilities, memory types (e.g., NAND flash memory, etc.), and so on. The set of instances rules may include a maximum number of instances rule and a maximum number of instances per node rule. The maximum number of instances rule may specify a maximum number of instances of the application to run in all of distributed computing system 12. The maximum number of instances per node rule specifies a maximum number of instances of the application that can operate on a single node of distributed computing system 12. The startup-disable rule specifies whether the application is to start when distributed computing system 12 boots.

Thus, when master system manager 200 determines the updated state of distributed computing system 12, master system manager 200 may determine, based on one or more of rules in the set of rules for the application specifying attributes of nodes able to run the application, whether the second node is able to run the application in the updated state of distributed computing system 12. Additionally, master system manager 200 may determine, based on a first rule in the set of rules for the application, whether the application runs on all of the nodes 22 of distributed computing system 12 in the updated state of distributed computing system 12. Furthermore, master system manager 200 may determine, based on a second rule in the set of rules for the application, a maximum number of instances of the application that are allowed to be started in the updated state of distributed computing system 12. Master system manager 200 may also determine, based on a third rule in the set of rules for the application, a maximum number of instances of the application that are allowed to be started on a single node in the updated state of distributed computing system 12. Additionally, master system manager 200 may determine, based on a fourth rule in the set of rules for the application, whether to start the application as part of a boot process of distributed computing system 12.

The rule set for the application may also include a set of upgrade rules. In other words, the set of rules for the application may include one or more rules controlling upgrades of the application. The set of upgrade rules governs how the application is upgraded. In the example syntax provided above, the set of upgrade rules may include a method rule, a start-after rule, a start-after-group rule, a stop-after rule, a stop-after-group rule, a notify rule, a pre-upgrade notification rule, and a weight rule. The method rule specifies an update method for the application. The update method may be sequential or parallel. If the upgrade method is sequential, instances of the application are upgraded sequentially (i.e., one after another). If the upgrade method is parallel, all instances of the application may be upgraded in parallel. The start-after rule indicates that, when the application is being upgraded, the application is to be started after starting an application specified by the start-after rule. The start-after-group rule indicates that, when the application is being upgraded, the application is to be started after starting a group of applications specified by the start-after-group rule. The stop-after rule specifies that, when the application is being upgraded, the application is to be stopped after an application specified by the stop-after rule. The stop-after-group rule specifies that, when the application is being upgraded, the application is to be stopped after a group of applications specified by the stop-after-group rule. The notify rule specifies when and whether a notification associated with an upgrade of the application is to be generated. For instance, the notify rule may specify that a notification is to be generated when preparing to upgrade the application, when an upgrade of the application is completed on a node of distributed computing system 12, or when an upgrade of all instances of the application is completed on all nodes of distributed computing system 12. The pre-upgrade notification rule (e.g., notify-pre-app-upgrade) may indicate one or more other applications that are to be notified prior to upgrading the application. The upgrade of the application does not begin until the one or more other applications acknowledge the notifications. The weight rule may be used to determine a priority of upgrades to the application relative to other applications.

Thus, when master system manager 200 determines the updated state of distributed computing system 12, master system manager 200 may determine, based on a first rule in the set of rules for the application, whether an update method for the application is sequential or parallel. Furthermore, master system manager 200 may determine, based on a second rule in the set of rules for the application, whether one or more applications are started in the updated state of distributed computing system 12 prior to starting the application following upgrading of the application. Additionally, master system manager 200 may determine, based on a third rule in the set of rules for the application, whether one or more applications are stopped in the updated state of distributed computing system 12 prior to upgrading the application. Furthermore, master system manager 200 may determine, based on a fourth rule in the set of rules for the application, whether a notification is to be output responsive to an upgrade of the application. Master system manager 200 may also determine, based on a fifth rule in the set of rules for the application, a priority of an upgrade of the application relative to upgrades to other applications of the distributed computing system.

As indicated above, a stop-after rule in a rule set for a first application indicates a second application. When upgrading the first application, the first application is to be stopped after the second application is stopped. To implement a stop-after rule, master system manager 200 may receive input (e.g., an indication of user input) indicating that the first application is to be upgraded. In response, master system manager 200 may output an updated system state indicating that the second application is in an exit state. Accordingly, a system manager for a node at which the second application is operating causes the second application to enter the exit state. When the second application enters the exit state, the system manager for the node at which the second application was operating publishes, as part of dynamic state 208, that the second application is in the exit state. Master system manager 200 may then output an updated system state indicating that the first application is in the exit state. Based on the updated system state, a system manager for a node at which the first application is operating then causes the first application to enter the exit state, at which time the first application may be upgraded. Master system manager 200 may perform a similar series of actions to implement a stop-after-group rule, except that multiple applications may be involved instead of just the second application.

A start-after rule in a rule set for a first application indicates a second application. When an upgrade of the first application is complete, master system manager 200 may output an updated system state indicating that the second application is in an initialized or ready state. Accordingly, a system manager for a node on which the second application is to operate causes the second application to enter the initialized or ready state. When the second application enters the initialized or ready state, the system manager publishes, as part of dynamic state 208, that the second application is in the initialized or ready state. Master system manager 200 may then output an updated system state indicating that the first application is in the initialized or ready state. Based on the updated system state, a system manager for a node at which the first application is to operate causes the now-upgraded first application to enter the initialized or ready state. Master system manager 200 may perform a similar series of actions to implement a start-after-group rule, except that multiple applications may be involved instead of just the second application.

As indicated above, the rule set for an application may include rules in addition to the set of metadata rules, the set of application failure rules, the set of resource rules, and the set of upgrade rules. For instance, the rule set for the application may include a use indicator, a leader rule, and an app-group rule. The use indicator (i.e., use <include.app>") is a way to include other application or group definition into the DSL specification. The leader rule indicates a leader of a group of applications. If a group of application has a leader, all applications of the group operate on the same node of distributed computing system 12 as the leader application of the group of applications. The app-group rule specifies one or more groups of applications to which the application belongs.

In addition to master system manager 200 determining the updated system state, master system manager 200 may perform particular garbage collection functions. For example, an application may create state information (e.g., in system state cloud 50, FIG. 2) and then fail. In this example, master system manager 200 may clean up the state information for failed application. For instance, when an application enters the failed state, master system manager 200 (or another system manager) may initiate a garbage collection process that scans a distributed data store (DDS) for the messages produced by the application and may issue instructions to delete the message produced by the application. The DDS may store state information for distributed computing system 12.

In some examples, nodes 22 may join or leave distributed computing system 12. For instance, a node may join distributed computing system 12 when the node starts and is ready to host applications in distributed computing system 12. A node may leave distributed computing system 12 when the node fails or is taken offline. Master system manager 200 may determine that a node has joined distributed computing system 12 based on the dynamic state data published by the components in the software infrastructure of the node (e.g., kernel 100, ordered communication module 106, system manager 30A, application infrastructure 110). Furthermore, master system manager 200 may receive dynamic state data indicating that a node has entered a stopped state (i.e., a state indicating that the node has left distributed computing system 12). Furthermore, in some examples, master system manager 200 may use heartbeat requests or another mechanism to determine whether a node is still reachable. If the node is not still reachable, master system manager 200 may determine that the node has entered a failed state. When master system manager 200 determines that a node has joined distributed computing system 12, master system manager 200 may determine an updated state of distributed computing system 12 indicating that the node hosts a particular application. When master system manager 200 determines that a node has left distributed computing system 12, master system manager 200 may determine an updated state of distributed computing system 12 in which one or more other nodes remaining in distributed computing system 12 host the applications previously hosted by the node that left distributed computing system 12. In this way, master system manager 200 may adapt the locations of applications as nodes join and leave distributed computing system 12.

By determining the updated state of distributed computing system 12 based on rules 206 and dynamic state 208, master system manager 200 may perform load balancing within distributed computing system 12. In other words, in the updated state of distributed computing system 12, a processing load is more evenly balanced among nodes 22 of distributed computing system 12 than in the current state of distributed computing system 12. For example, a first instance of an application may operate on a first node of distributed computing system 12. In this example, dynamic state 208 may indicate that a CPU utilization rate and/or a memory utilization rate of the first node are above particular thresholds. Furthermore, in this example, master system manager 200 may determine that there is a second node in distributed computing system 12 that has the attributes specified by the attribute rules for the application and has a CPU utilization rate and/or a memory utilization rate below additional thresholds. Thus, in this example, the updated state determined by master system manager 200 may indicate that a second instance of the application is operating on the second node. The second instance of the application may relieve some of the burden on the first instance of the application. This is one example of the master system manager determining, based at least in part on node resource data, the updated state of distributed computing system 12.

In another example, a first instance of an application and a second instance of the application may operate concurrently on a first node and a second node, respectively. In this example, master system manager 200 may determine that CPU utilization rates and/or memory utilization rates of the first and second nodes are below particular thresholds. Accordingly, in this example, the updated state of distributed computing system 12 may indicate that the first or second instance of the application is in an exit state. In this way, master system manager 200 may reduce overcapacity of the application and free resources for other applications.

In some examples, master system manager 200 has a command line interface (CLI) and/or a programmatic interface. These interfaces may be used to control applications in distributed computing system 12. For instance, users or programs may use these interface to perform various actions with regard to applications 26. For example, users or programs may use these interfaces to start an application, stop an application, or put an application in a special mode to facilitate operations such as an upgrade of the application.

Furthermore, in some examples, satellite system managers 204 may output alarms to indicate error conditions. For example, a satellite system manager may output an alarm to indicate a persistent failure of a non-critical process, an inability to create a standby application or standby master system manager when one is updated, a failure to resolve which of the system managers is the master system manager, an inability to adhere to a policy because of policy conflicts, and/or an application death resulting in the raising of a configured alarm. An alarm may be stored in a log file and/or output for display to a user.

Figure 5:
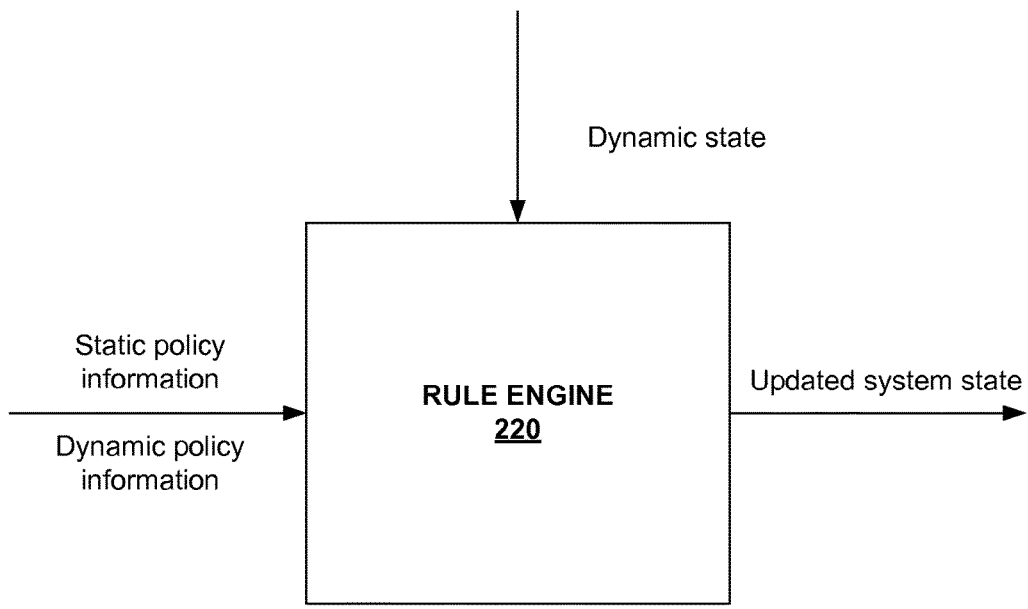
FIG. 5 is a block diagram illustrating an example rule engine, in accordance with one or more techniques of this disclosure.

FIG. 5 is a block diagram illustrating an example rule engine 220, in accordance with one or more techniques of this disclosure. Master system manager 200 may include rule engine 220. Rule engine 220 may determine the updated state of distributed computing system 12. Master system manager 200 may provide rule engine 220 with static and dynamic policy information. In addition, master system manager 200 may also provide rule engine 220 with the dynamic state of distributed computing system 12. The dynamic state of distributed computing system 12 may include data indicating the nodes and their properties in the system and the current state of applications in distributed computing system 12. Rule engine 220 evaluates the rules under the confines of the set of nodes, applications, and state of the applications available in distributed computing system 12 and may publish the updated system state. Master system manager 200 may provide the updated system state to satellite system managers.

As indicated above, master system manager 200 may provide static and dynamic policy information to rule engine 220. The static policy information may be specified using the DSL. The static policy information and the dynamic policy specification result in a set of rules that are provided to rule engine 220. For example, a rule can be of the form "App <app_name> wants nodes with <attributes>" or another rule can be of the form "App <app_name> should have n instances in the system." The decision of which application should run on a node in a distributed system is based on the rules.

The rule set may be dynamic as rules can be added or deleted. For example, new rules can be added as new applications are added to distributed computing system 12. Similarly, rules can be deleted from the rule set if an application is removed from distributed computing system 12.

Furthermore, as indicated above, master system manager 200 receives dynamic state information. The dynamic state information may include node events. The node events may be generated when nodes are added/removed from distributed computing system 12 or when properties (CPU, memory, etc.) of existing nodes change. Thus, the dynamic state information may include host composition information and hardware inventory. The occurrence of a node event may trigger rule engine 220 to evaluate the rules and make any adjustments to the updated state of distributed computing system 12.

Additionally, the dynamic state information may include application events. Application events may be generated by applications running on nodes of distributed computing system 12. Application events may include application offline/online events, application failure events or application admin stop events. Thus, the application events may include events related to the application run state. The occurrence of an application event may trigger rule engine 220 to evaluate the rules against the current state of the current state and make any adjustments to the updated system state of distributed computing system 12. The updated state indicates which applications should run on any node and is communicated to the system managers on the node.

Figure 6:
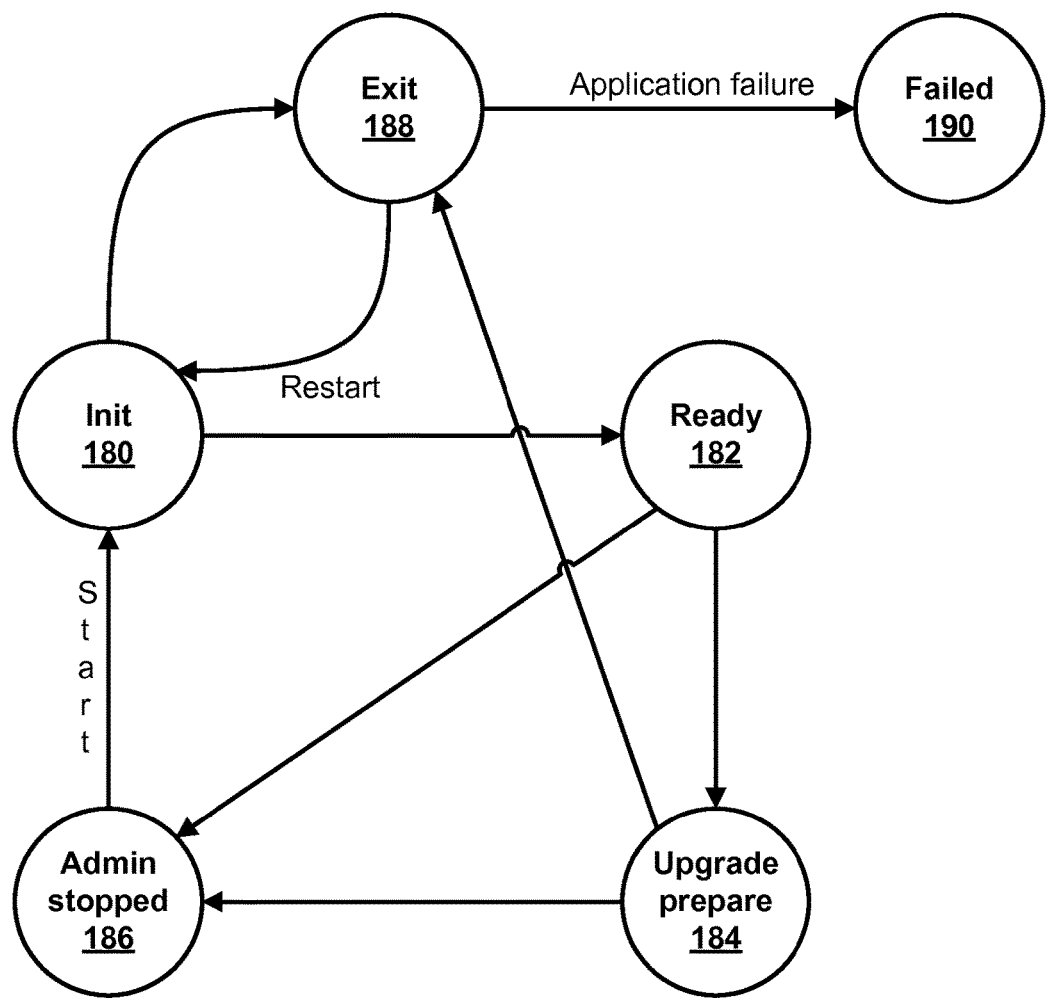
FIG. 6 is a state transition diagram for applications operating in the distributed computing system, in accordance with one or more techniques of this disclosure.

FIG. 6 is a state transition diagram for applications operating in distributed computing system 12, in accordance with one or more techniques of this disclosure. In the example of FIG. 6, an application, such as any of applications 26, may transition between an "init" state 180, a "ready" state 182, an "upgrade prepare" state 184, an "admin stopped" state 186, an "exit" state 188, and a "failed" state 190. When the application is in "init" state 180, the application has started and is online. When the application is in "ready" state 182, the application has resynchronized state from the DDS and is ready to go active. When the application is in "upgrade prepare" state 184, the application has received an upgrade prepare notification. When the application is in "admin stopped" state 186, the application has been stopped by a user. When the application is in "exit" state 188, the application has exited. When the application is in "failed" state 190, the application has failed.

The arrows between states 180, 182, 184, 186, 188, and 190 indicate possible transitions between states 180, 182, 184, 186, 188, and 190. For example, the application may transition from "admin stopped" state 186 to "init" state 180 when the application starts. Similarly, the application may transition from "upgrade prepare" state 184 to "admin stopped" state 186 when the application is restarted.

As indicated above, a system manager (e.g., any of system managers 30) of a node monitors the states of applications operating on the node. For instance, the system manager may determine that an application has transitioned to "failed" state 190. In some examples, the system manager periodically sends "heartbeat" requests to an application. If the application fails to respond to a particular number of "heartbeat" requests, the system manager determines that the application has entered "exit" state 188 or "failed" state 190. In this example, the particular number of "heartbeat" requests may be user configurable. Furthermore, in some examples, the system manager may determine, based on an application-specific policy for an application (e.g., one or more rules in a rule set for the application) whether the application has transitioned from "exit" state 188 to "failed" state 190.

When an application operating on the node transitions from a first state to a second state, the application or the system manager may publish the fact that the application is now in the second state. In some examples, the application or system manager may republish the state of the application each time the application transitions between states. For example, if the application transitions from "init" state 180 to "ready" state 182, the application or system manager publishes that the application is in "ready" state 182. In this way, the state of the application becomes part of the dynamic state of distributed computing system 12. As indicated above, the master system manager (e.g., master system manager 200) receives the dynamic state of distributed computing system 12 and determines, based on rule sets for applications and the dynamic state of distributed computing system 12, an updated state of distributed computing system 12.

Figure 7:
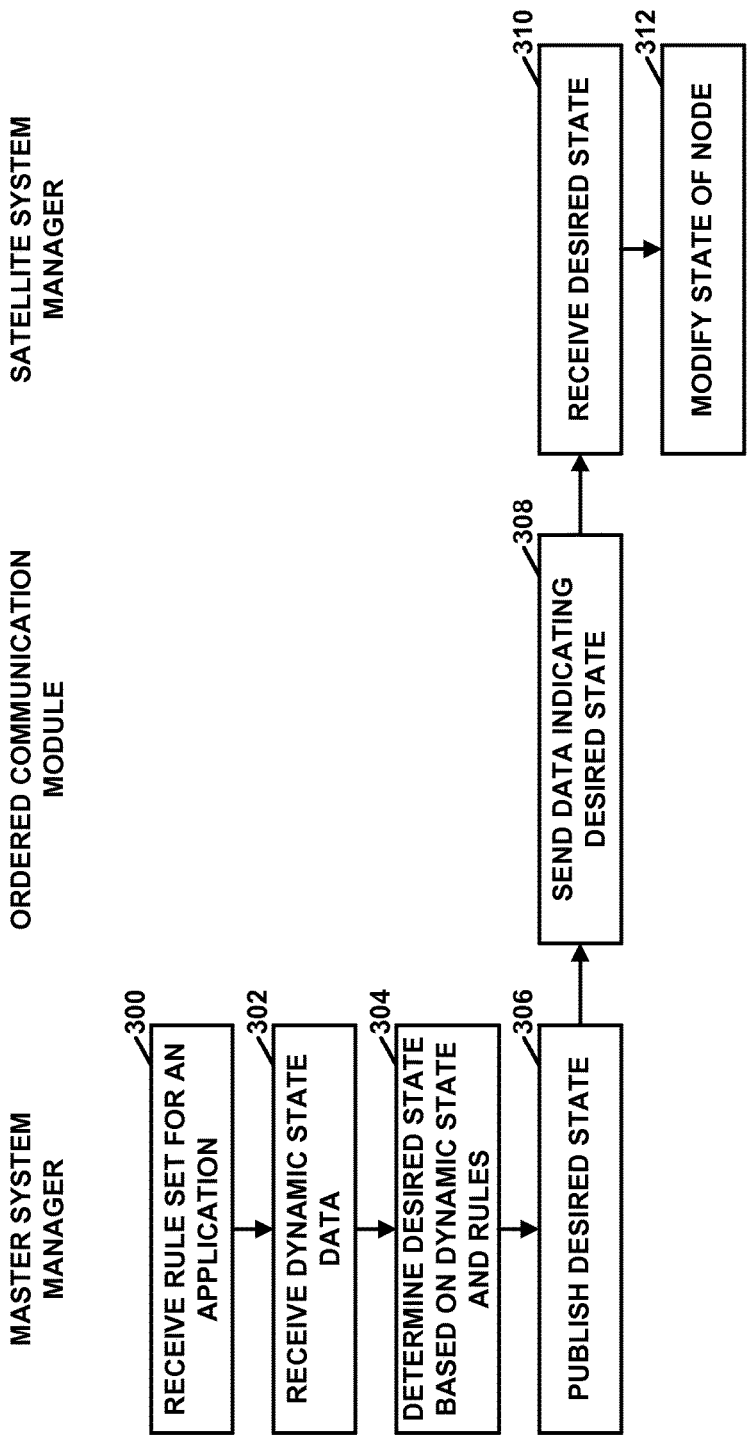
FIG. 7 is a flowchart illustrating an example operation of the distributed computing system to update the state of a node, in accordance with one or more techniques of this disclosure.

FIG. 7 is a flowchart illustrating an example operation of distributed computing system 12 to update the state of a node, in accordance with one or more techniques of this disclosure. For ease of explanation, this disclosure describes the example of FIG. 7 with reference to other figures of this disclosure. However, the operation of FIG. 7 is not necessarily limited to the examples those figures.

In the example of FIG. 7, master system manager 200 receives a rule set for an application (300). Although not shown in the example of FIG. 7, master system manager 200 may receive respective rule sets for a plurality of applications. For example, master system manager 200 may receive a respective rule set for each respective application configured to operate in distributed computing system 12.

Furthermore, in the example of FIG. 7, master system manager 200 receives dynamic state data (302). The dynamic state data may indicate states of applications operating on nodes 22 of distributed computing system 12. For instance, the dynamic state data may indicate that an application is in one of states 180, 182, 184, 186, 188, or 190 (FIG. 6).

Master system manager 200 may determine an updated state of distributed computing system 12 based at least in part on the dynamic state data and the rule set of the application (304). Master system manager 200 may then publish the updated state of distributed computing system 12 (306). When master system manager 200 publishes the updated state of distributed computing system 12, ordered communication module 202 may send data indicating the updated state of distributed computing system 12 to satellite system managers (308).

Subsequently, a satellite system manager may receive the data indicating the updated state of distributed computing system 12 (310). The satellite system manager may operate on a satellite node of distributed computing system 12. In response to receiving the data indicating the updated state of distributed computing system 12, the satellite system manager may modify a state of the satellite node to conform the actual state of the satellite node to a state of the satellite node in the updated state of distributed computing system 12 (312). For example, when the satellite system manager modifies the state of the satellite node, the satellite system manager may start an application on the satellite node, stop the application on the satellite node, and/or modify a state of the application on the satellite node. A system manager may modify a state of the application in various ways. For example, the system manager may provide input to the application, change data used by the application, cause the application to transition among states 180, 182, 184, and 186, or otherwise change some aspect of the application.

Although the example of FIG. 7 shows master system manager 200 receiving the rule set once and the dynamic state data once, master system manager 200 may receive dynamic state data multiple times. Master system manager 200, ordered communication module 202, and the satellite system manager may perform actions 304-312 each time master system manager receives dynamic state data.

Figure 8:
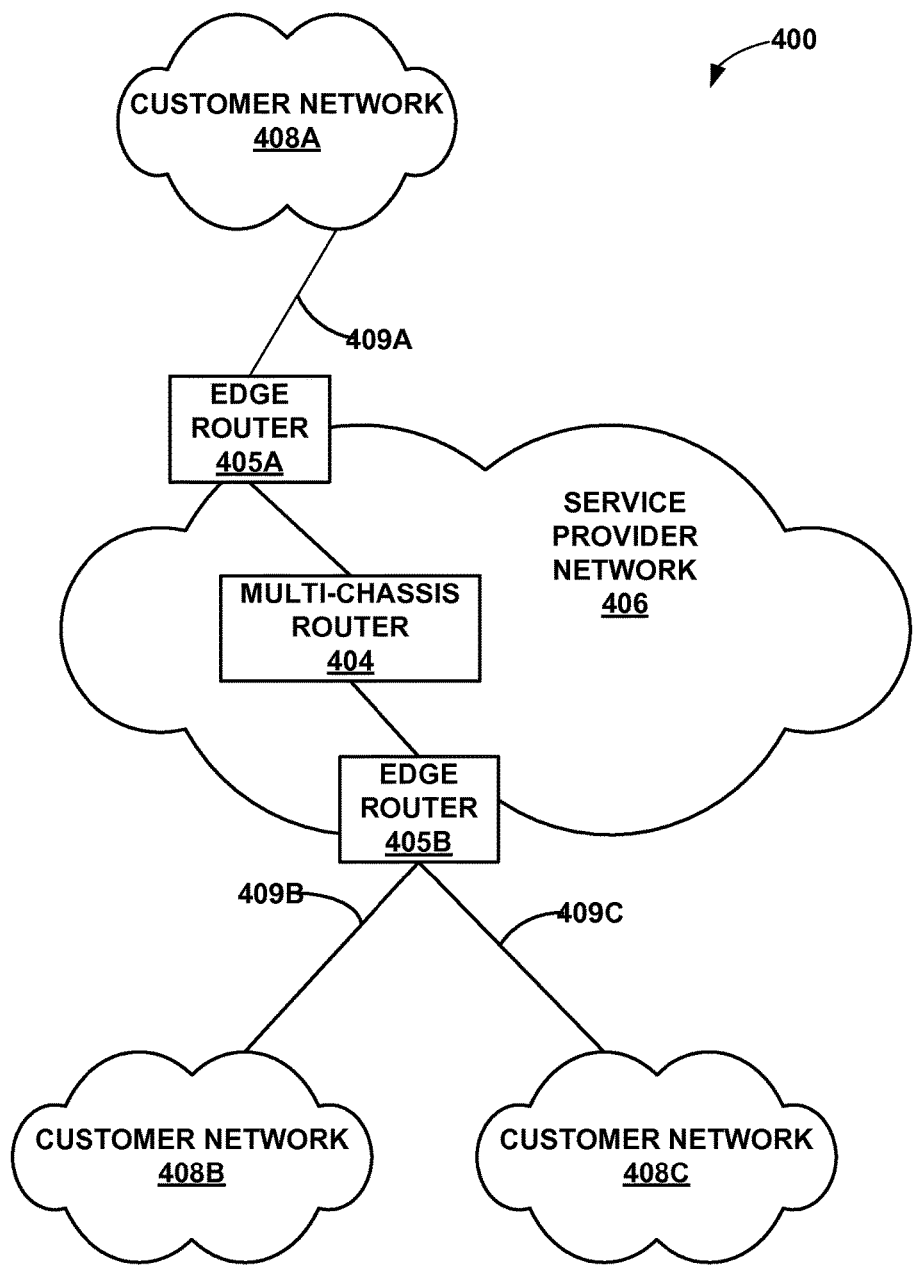
FIG. 8 is a block diagram illustrating an example computing environment in which a service provider network includes a multi-chassis router.

FIG. 8 is a block diagram illustrating an example computing environment 400 in which a service provider network 406 includes a multi-chassis router 404. A multi-chassis router is a type of distributed routing system in which at least two nodes are implemented on separate chassis. For purposes of example, particular techniques of this disclosure are described with respect to the computing environment 400 of FIG. 8 in which multi-chassis router 404 communicates with edge routers 405A and 405B ("edge routers 405") to provide customer networks 408A-408C ("customer networks 408") with access to a service provider network 406. Multi-chassis router 404 may send periodic data, such as packets, to edge routers 405 in order to maintain an accurate representation of the topology of service provider network 406. Multi-chassis router 404 may comprise a plurality of hierarchically arranged cooperative routing components operating as a single node within service provider network 406. In one example, multi-chassis router 404 includes a switch card chassis (SCC) that operates as a control node and one or more line card chassis (LCCs) that operate as packet routing devices. The LCCs may contain all the physical interfaces for coupling to other devices within network 406, while the SCC controls and routes traffic between the LCCs. In some examples, an LCC may be referred to as a forwarding unit.

Although not illustrated in the example of FIG. 8, service provider network 406 may be coupled to one or more networks administered by other providers, and may thus form part of a large-scale public network infrastructure, e.g., the Internet. Consequently, customer networks 408 may be viewed as edge networks of the Internet. Service provider network 406 may comprise computing devices within customer networks 408 with access to the Internet, and may allow the computing devices within customer networks 408 to communicate with each other. Service provider network 406 may include a variety of network devices other than multi-chassis router 404 and edge routers 405, such as additional routers, switches, servers, or other devices.

In the example of FIG. 8, edge router 405A is coupled to customer network 408A via an access link 409A and edge router 405B is coupled to customer networks 408B and 408C via access links 409B and 409C, respectively. In some examples, customer networks 408 comprise networks for geographically separated sites of an enterprise. Customer networks 408 may include one or more computing devices (not shown), such as personal computers, laptop computers, mobile computers, tablet computers, smartphones, workstations, servers, switches, printers, wearable computers, network-connected devices or machines, robotic devices or vehicles, or other devices. The configuration of computing environment 400 illustrated in FIG. 8 is merely exemplary. For example, service provider network 406 may be coupled to any number of customer networks 408. Nonetheless, for ease of description, FIG. 8 only shows customer networks 408A-408C.

Consistent with one or more techniques of this disclosure, multi-chassis router 404 sends periodic data packets to edge routers 405 in order to maintain an accurate representation of the topology of service provider network 406. For example, multi-chassis router 404 may exchange periodic communications using one or more routing protocols, such as Bidirectional Flow Detection (BFD), Open Shortest Path First (OSPF), or Intermediate System-to-Intermediate System (ISIS). Multi-chassis router 404 may further use periodic communication when using Media Access Control (MAC) layer protocols such as Frame Relay LMI, point-to-point protocol (PPP) and the like.

In some examples, multi-chassis router 404 manages time critical periodic messages with a periodic packet management (PPM) daemon executing within multi-chassis router 404 (not shown). In accordance with one or more techniques of this disclosure, each instance of the PPM daemon may be an instance of an application running on a node of multi-chassis router 404. A router protocol daemon, also executing within multi-chassis router 404, performs routing operations. In accordance with one or more techniques of this disclosure, each instance of the router protocol daemon may be an instance of an application running on a node of multi-chassis router 404. Client routing protocols (not shown) executing within multi-chassis router 404 configure the parameters of the PPM daemon. In accordance with one or more techniques of this disclosure, each instance of the client routing protocols may be an instance of an application running on a node of multi-chassis router 404. In general, the periodic management daemon manages inbound and outbound periodic communication sessions on behalf of the clients, while the client routing protocols interact with the routing protocol daemon implements the complex routing protocols and other functions. Moreover, instances of the PPM daemon may execute on the SCC and on each of the LCCs of multi-chassis router 404, thereby distributing the task of initiating and responding to periodic messages for indicating operation state between multi-chassis router 404 and peer devices, e.g., edge routers 405. In some embodiments, multi-chassis router 404 may push the periodic packet management functionality down to operational environments provided by interface cards (IFCs) of one or more LCCs.

Multi-chassis router 404 may comprise a plurality of nodes. In some examples, such nodes may include SCCs and LCCs. In some examples, individual LCs or hardware PFEs may act as nodes of multi-chassis router 404. Thus, multi-chassis router 404 may be a form of a distributed computing system. In accordance with one or more techniques of this disclosure, a system manager may operate on each node of multi-chassis router 404. Each of the system managers operating on the nodes of multi-chassis router 404 may be a system manager of the type described elsewhere in this disclosure.

Thus, in one example, a first system manager may operate on a first node of multi-chassis router 404 and a second system manager may operate on a second node of multi-chassis router 404. In this example, the first system manager may receive data indicating a current state of multi-chassis router 404. The first system manager may determine, based at least in part on the current state of multi-chassis router 404 and a set of rules for an application, an updated state of multi-chassis router 404. Furthermore, the first node may send updated state data to the second node of multi-chassis router 404. The updated state data may indicate at least a portion of the updated state of multi-chassis router 404. Responsive to receiving the updated state data, the second system manager (i.e., the system manager operating on the second node of multi-chassis router 404) may modify a state of the second node to conform to the updated state of multi-chassis router 404. As part of modifying the state of the second node, the second node may start the application on the second node, stop the application on the second node, modify a state of the application on the second node, or perform another action.

Figure 9:
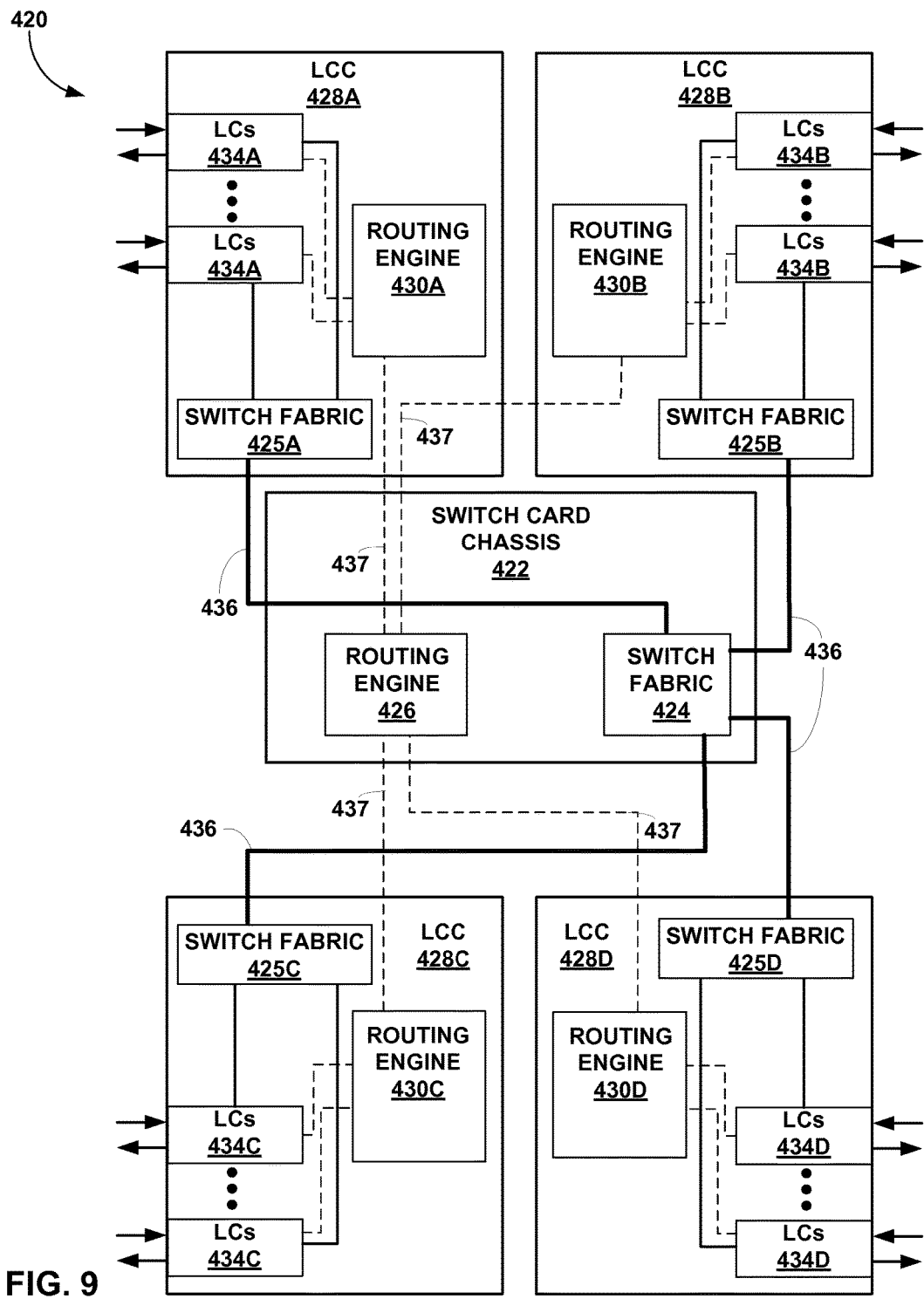
FIG. 9 is a block diagram illustrating an exemplary multi-chassis router that operates consistent with one or more techniques of this disclosure.

FIG. 9 is a block diagram illustrating an exemplary multi-chassis router 420 that operates consistent with one or more techniques of this disclosure. Multi-chassis router 420 routes data packets between network devices across a network. As shown in FIG. 9, multi-chassis router includes a plurality of hierarchically arranged cooperative routing components operating as a single node within a network. In this example, multi-chassis router 420 comprises four substantially identical LCCs 428A-428D ("LCCs 428") and an SCC 422 that operates as a central control node. In other examples, a multi-chassis router may include more or fewer LCCs, and may or may not include a central routing node SCC 422. SCC 422 provides centralized switching and control for multi-chassis router 420. LCCs 428 provide interfaces to a network using IFC sets 434A-434D ("IFCs 434").

SCC 422 includes switch fabric 424 and master routing engine 426. Switch fabric 424 provides a back-side connection, i.e., a connection separate from the network, between switch fabrics 425A-425D ("switch fabrics 425") of LCCs 428. Master routing engine 426 maintains routing information to describe a topology of a network. For example, the routing information may include route data that describes various routes through the network, and also next hop data indicating appropriate neighboring devices within the network for each of the routes. Master routing engine 426 periodically updates the routing information to accurately reflect the current network topology. Master routing engine 426 also uses the routing information to derive forwarding information bases (FIBs).

Master routing engine 426 controls packet forwarding throughout multi-chassis router 420 by installing a FIB (not shown) in LCCs 428 via communication with local routing engines 430 and/or 431 over cables 437. A FIB for one of LCCs 428 may be the same or different than a FIB for other LCCs 428 and SCC 422. In some examples, because cables 437 provide a dedicated connection, i.e., separate from a data packet forwarding connection provided by cables 136, between SCC 422 and LCCs 428, FIBs in LCC routing engines 430 can be updated without interrupting packet forwarding performance of multi-chassis router 420. LCCs 428 each contain one of local routing engines 430A-430D ("routing engines 430"), a respective one of switch fabrics 425, at least one packet forwarding engine (PFE), shown as PFEs 432A-432D ("PFEs 432"), and one or more sets of IFCs 434.

In some examples, multi-chassis router 420 performs routing functions in the following manner. An incoming data packet is first received from a network by one of IFCs, of an LC 434, which directs the incoming data packet to a PFE of the LC. The PFE then determines a next hop for the data packet using the FIB provided by the local routing engine, e.g., routing engine 430B. If the data packet is destined for an outbound link associated with the IFC that initially received the packet, the PFE forwards the packet to the outbound link. In this manner, packets may be sent out by the same PFE on which they were received from the network bypass switch fabric 424 and switch fabric 425.

Otherwise, if the data packet is destined for an outbound link associated with the one of LCs 434 that initially received the packet, the PFE sends the data packet to switch fabric 425 of the LCC containing the LC, where the data packet is directed to switch fabric 424 and ultimately is communicated to one of the PFEs. The receiving PFE outputs the data packet to the appropriate next hop via one of the IFCs on one of LCs 434. Thus, an incoming data packet received by one of LCCs 428 may be sent by another one of LCCs 428 to a next hop along a route to the packets ultimate destination. Other multi-chassis routers that operate in a manner consistent with the techniques of this disclosure may use different switching and routing mechanisms.

Multi-chassis router 420 and, in particular, SCC 422 and LCCs 428 include hardware, firmware and or software, and may include processors, control units, discrete hardware circuitry, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like.

In accordance with one or more techniques of this disclosure, SCC 422 and each of LCCs 428 serves as a "node" of multi-chassis router 420. Thus, system managers operate on SCC 422 and each of LCCs 428. The system managers operating on SCC 422 and LCCs 428 may act in a similar manner as the system managers described elsewhere in this disclosure. Furthermore, applications may run on SCC 422 and LCCs 428. For instance, the routing functions of multi-chassis router 420 may arise from routing applications running on SCC 422 and LCCs 428. In some examples, applications other than routing applications may run on SCC 422 and LCCs 428. For example, intrusion detection applications, virus protection applications, lawful intercept applications, and other types of applications may run on SCC 422 and LCCs 428.

Thus, in one example, a system manager operating on a first LCC (e.g., one of LCCs 428) of multi-chassis router 420 receives data indicating a current state of multi-chassis router 420. In this example, the system manager operating on the first LCC determines, based at least in part on the current state of multi-chassis router 420 and a set of rules for an application, an updated state of multi-chassis router 420. Furthermore, in this example, the system manager of the first LCC sends updated state data to a second LCC of multi-chassis router 420. The updated state data may indicate at least a portion of the updated state of multi-chassis router

420. Responsive to receiving the updated state data, the system manager of the second LCC modifies a state of the second node to conform to the updated state of the multi-chassis router. Modifying the state of the second LCC may comprise at least one of: starting the application on the second LCC, stopping the application on the second LCC, or modifying a state of the application on the second LCC. A similar example can be provided with SCC 422 in place of the first LCC or the second LCC.

Figure 10:
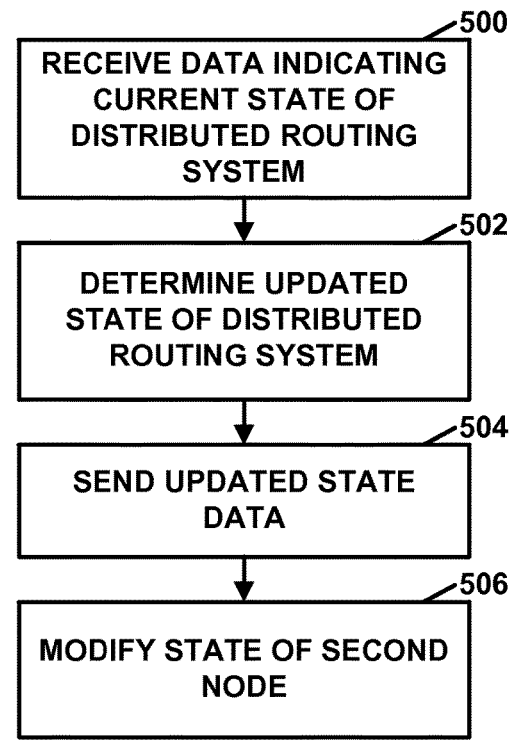
FIG. 10 is a flowchart illustrating an example operation of a distributed routing system, in accordance with one or more techniques of this disclosure.

FIG. 10 is a flowchart illustrating an example operation of a distributed routing system, in accordance with one or more techniques of this disclosure. The example operation of FIG. 10 includes a reduced set of actions, relative to the example of FIG. 7. In the example of FIG. 10, a first system manager operating on a first node of a distributed routing system that includes a plurality of nodes receives data indicating a current state of the distributed routing system (500). The first system manager determines, based at least in part on the current state of the distributed routing system and a set of rules for an application, an updated state of the distributed routing system (502). In the example of FIG. 10, the first node sends updated state data to a second node of the distributed routing system, the updated state data indicating at least a portion of the updated state of the distributed routing system, the first and second nodes being different ones of the plurality of nodes included in the distributed routing system. Furthermore, in the example of FIG. 10, responsive to receiving the updated state data, a second system manager on the second node modifies a state of the second node to conform to the updated state of the distributed routing system (504). Modifying the state of the second node may comprise at least one of: starting the application on the second node, stopping the application on the second node, or modifying a state of the application on the second node.

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC.

Various examples have been described. These and other embodiments are within the scope of the following claims.

The invention claimed is:

1. A method comprising:
publishing, by a plurality of applications operating on nodes of a distributed routing system that includes a plurality of nodes, state data indicating current states of the applications, the plurality of nodes including at least a first node and a second node;
publishing, by system managers operating on the nodes of the distributed routing system, state data that includes node resource data that comprises information regarding utilization levels of hardware resources of the nodes of the distributed routing system, wherein the plurality of system managers includes at least a first system manager and a second system manager, the first system manager operates on the first node, the second system manager operates on the second node, and data indicating a current state of the distributed routing system includes the state data published by the applications and the state data published by the system managers;
determining, by the first system manager, based at least in part on (1) the state data published by the applications, (2) the state data published by the system managers, and (3) a set of rules for an application, an updated state of the distributed routing system, the application being in the plurality of applications, the updated state of the distributed routing system comprising an updated state of each of the nodes of the distributed routing system;
sending, by the first node, updated state data to the second node, the updated state data indicating the updated state of the distributed routing system for each of the nodes of the distributed routing system, the first and second nodes being different ones of the plurality of nodes included in the distributed routing system; and
responsive to receiving the updated state data, modifying, by the second system manager, a state of the second node to conform to the updated state of the distributed routing system as indicated in the updated state data, wherein modifying the state of the second node comprises at least one of: starting the application on the second node, stopping the application on the second node, or modifying a state of the application on the second node.

2. The method of claim 1, wherein the distributed routing system is a multi-chassis router.

3. The method of claim 2, wherein each respective node of the plurality of nodes comprises a respective line card chassis or switch card chassis.

4. The method of claim 1, wherein:
the node resource data includes data indicating at least one of: current central processing unit (CPU) utilization for the second node, memory usage of the second node, or available memory for the second node, and
determining the updated state of the distributed routing system comprises determining, by the first system manager, based at least in part on the node resource data, the updated state of the distributed routing system.

5. The method of claim 1, wherein in the updated state of the distributed routing system a processing load is more evenly balanced among the plurality of nodes included in the distributed routing system than in the current state of the distributed routing system.

6. The method of claim 1, wherein the set of rules for the application includes one or more rules for determining the updated state of the distributed routing system responsive to a failure of the application, wherein a failure of the application occurs when the application has stopped due to the application entering an exit state a particular number of times within a given time interval, wherein when the application is in the exit state, the application is not running or is not responsive.

7. The method of claim 6, wherein determining the updated state of the distributed routing system comprises at least one of:
determining, based on a first rule in the set of the rules for the application and based on the current state of the distributed routing system indicating the failure of the application, whether the application is restarted in the updated state of the distributed routing system,
determining, based on a second rule in the set of rules for the application and based on the current state of the distributed routing system indicating the failure of the application, whether a node on which the application was operating is restarted in the updated state of the distributed routing system,
determining, based on a third rule in the set of rules for the application and based on the current state of the distributed routing system indicating the failure of the application, whether another application is executed in the updated state of the distributed routing system, and
determining, based on a fourth rule in the set of rules for the application and based on the current state of the distributed routing system indicating the failure of the application, whether an alarm is raised in the updated state of the distributed routing system.

8. The method of claim 1, wherein the set of rules for the application includes one or more rules for determining the updated state of the distributed routing system responsive to the application entering an exit state, wherein when the application is in the exit state, the application is not running or is not responsive.

9. The method of claim 8, wherein determining the updated state of the distributed routing system comprises at least one of:
determining, based on a first rule in the set of rules for the application and based on the current state of the distributed routing system indicating that the application has entered the exit state, whether the application is restarted in the updated state of the distributed routing system,
determining, based on a second rule in the set of rules for the application and based on the current state of the distributed routing system indicating that the application has entered the exit state, whether a node on which the application is operating is restarted in the updated state of the distributed routing system,
determining, based on a third rule in the set of rules for the application and based on the current state of the distributed routing system indicating that the application has entered the exit state, a list of one or more applications that are restarted in the updated state of the distributed routing system,
determining, based on a fourth rule in the set of rules for the application and based on the current state of the distributed routing system indicating that the application has entered the exit state, whether a second application is executed in the updated state of the distributed routing system,
determining, based on a fifth rule in the set of rules for the application, a rule indicating a number of times to restart the application in response to the application entering the exit state, or
determining, based on a sixth rule in the set of rules for the application, a time interval during which a particular number of times the application has to restart before determining that the application has entered a failed state.

10. The method of claim 1, wherein determining the updated state of the distributed routing system comprises at least one of:
determining, based on one or more of rules in the set of rules for the application specifying attributes of nodes able to run the application, whether the second node is able to run the application in the updated state of the distributed routing system,
determining, based on a first rule in the set of rules for the application, whether the application runs on all of the plurality of nodes included in the distributed routing system in the updated state of the distributed routing system,
determining, based on a second rule in the set of rules for the application, a maximum number of instances of the application that are allowed to be started in the updated state of the distributed routing system,
determining, based on a third rule in the set of rules for the application, a maximum number of instances of the application that are allowed to be started on a single node in the updated state of the distributed routing system, or
determining, based on a fourth rule in the set of rules for the application, whether to start the application as part of a boot process of the distributed routing system.

11. The method of claim 1, the set of rules for the application including one or more rules controlling upgrades of the application.

12. The method of claim 11, wherein determining the updated state of the distributed routing system comprises at least one of:
determining, based on a first rule in the set of rules for the application, whether an update method for the application is sequential or parallel,
determining, based on a second rule in the set of rules for the application, whether one or more applications are started in the updated state of the distributed routing system prior to starting the application following upgrading of the application,
determining, based on a third rule in the set of rules for the application, whether one or more applications are stopped in the updated state of the distributed routing system prior to upgrading the application, determining, based on a fourth rule in the set of rules for the application, whether a notification is to be output responsive to an upgrade of the application, or determining, based on a fifth rule in the set of rules for the application, a priority of an upgrade of the application relative to upgrades to other applications of the distributed routing system.

13. A distributed routing system comprising:
a plurality of nodes, the plurality of nodes including a first node and a second node, each of the nodes implemented using one or more computing devices or hardware, wherein:
   a plurality of applications operating on the nodes of the distributed routing system publish state data indicating current states of the applications;
   a plurality of system managers operating on the nodes publish state data that includes node resource data that comprises information regarding utilization levels of hardware resources of the nodes of the distributed routing system, wherein the plurality of system managers includes at least a first system manager and a second system manager, the first system manager operates on the first node, the second system manager operates on the second node, and data indicating a current state of the distributed routing system includes the state data published by the applications and the state data published by the system managers;
   determine, based at least in part on (1) the state data published by the applications, (2) the state data published by the system managers, and (3) a set of rules for an application, an updated state of the distributed routing system, the application being in the plurality of applications, the updated state of the distributed routing system comprising an updated state of each of the nodes of the distributed routing system; and
   send updated state data to the second node, the updated state data indicating the updated state of the distributed routing system for each of the nodes of the distributed routing system, the first and second nodes being different ones of the plurality of nodes included in the distributed routing system; and
wherein the second system manager is configured to:
   responsive to receiving the updated state data, modify a state of the second node to conform to the updated state of the distributed routing system as indicated in the updated state data, wherein modifying the state of the second node comprises at least one of: starting the application on the second node, stopping the application on the second node, or modifying a state of the application on the second node.

14. The distributed routing system of claim 13, wherein the distributed routing system is a multi-chassis router.

15. The distributed routing system of claim 13, wherein each respective node of the plurality of nodes comprises a respective line card chassis or switch card chassis.

16. The distributed routing system of claim 13, wherein:
the node resource data includes data indicating at least one of: current central processing unit (CPU) utilization for the second node, memory usage for the second node, or available memory for the second node, and
the first system manager is configured to determine, based at least in part on the node resource data, the updated state of the distributed routing system.

17. The distributed routing system of claim 13, wherein in the updated state of the distributed routing system a processing load is more evenly balanced among the plurality of nodes included in the distributed routing system than in the current state of the distributed routing system.

18. The distributed routing system of claim 13, wherein the set of rules for the application includes one or more rules for determining the updated state of the distributed routing system responsive to a failure of the application, wherein a failure of the application occurs when the application has stopped due to the application entering an exit state a particular number of times within a given time interval, wherein when the application is in the exit state, the application is not running or is not responsive.

19. The distributed routing system of claim 18, the first system manager is configured to:
   determine, based on a first rule in the set of the rules for the application and based on the current state of the distributed routing system indicating the failure of the application, whether the application is restarted in the updated state of the distributed routing system,
   determine, based on a second rule in the set of rules for the application and based on the current state of the distributed routing system indicating the failure of the application, whether a node on which the application was operating is restarted in the updated state of the distributed routing system,
   determine, based on a third rule in the set of rules for the application and based on the current state of the distributed routing system indicating the failure of the application, whether another application in the plurality of applications is executed in the updated state of the distributed routing system, or
   determine, based on a fourth rule in the set of rules for the application and based on the current state of the distributed routing system indicating the failure of the application, whether an alarm is raised in the updated state of the distributed routing system.

20. The distributed routing system of claim 13, wherein the set of rules for the application includes one or more rules for determining the updated state of the distributed routing system responsive to the application entering an exit state, wherein when the application is in the exit state, the application is not running or is not responsive.

21. The distributed routing system of claim 20, the first system manager is configured to:
   determine, based on a first rule in the set of rules for the application and based on the current state of the distributed routing system indicating that the application has entered the exit state, whether the application is restarted in the updated state of the distributed routing system,
   determine, based on a second rule in the set of rules for the application and based on the current state of the distributed routing system indicating that the application has entered the exit state, whether a node on which the application is operating is restarted in the updated state of the distributed routing system,
   determine, based on a third rule in the set of rules for the application and based on the current state of the distributed routing system indicating that the application has entered the exit state, a list of one or more applications that are restarted in the updated state of the distributed routing system,
   determine, based on a fourth rule in the set of rules for the application and based on the current state of the distributed routing system indicating that the application has entered the exit state, whether a second application is executed in the updated state of the distributed routing system, determine, based on a fifth rule in the set of rules for the application, a rule indicating a number of times to restart the application in response to the application entering the exit state, or determine, based on a sixth rule in the set of rules for the application, a time interval during which a particular number of times the application has to restart before determining that the application has entered a failed state.

22. The distributed routing system of claim 13, the first system manager is configured to:

determine, based on one or more of rules in the set of rules for the application specifying attributes of nodes able to run the application, whether the second node is able to run the application in the updated state of the distributed routing system, determine, based on a first rule in the set of rules for the application, whether the application runs on all of the plurality of nodes included in the distributed routing system in the updated state of the distributed routing system, determine, based on a second rule in the set of rules for the application, a maximum number of instances of the application that are allowed to be started in the updated state of the distributed routing system, determine, based on a third rule in the set of rules for the application, a maximum number of instances of the application that are allowed to be started on a single node in the updated state of the distributed routing system, or determine, based on a fourth rule in the set of rules for the application, whether to start the application as part of a boot process of the distributed routing system.

23. The distributed routing system of claim 13, the set of rules for the application including one or more rules controlling upgrades of the application.

24. The distributed routing system of claim 23, wherein the first system manager is configured to:

determine, based on a first rule in the set of rules for the application, whether an update method for the application is sequential or parallel, determine, based on a second rule in the set of rules for the application, whether one or more applications are started in the updated state of the distributed routing system prior to starting the application following upgrading of the application, determine based on a third rule in the set of rules for the application, whether one or more applications are stopped in the updated state of the distributed routing system prior to upgrading the application, determine, based on a fourth rule in the set of rules for the application, whether a notification is to be output responsive to an upgrade of the application, or determine, based on a fifth rule in the set of rules for the application, a priority of an upgrade of the application relative to upgrades to other applications of the distributed routing system.

25. A computer program product comprising one or more non-transitory computer-readable data storage media having instructions stored thereon, wherein:

a distributed routing system includes a plurality of nodes, the plurality of nodes including at least a first node and a second node, execution of the instructions configures a plurality of applications operating on the nodes of the distributed routing system to publish state data indicating current states of the applications;

execution of the instructions configures a plurality of system managers operating on the nodes of the distributed routing system to publish state data that includes node resource data that comprises information regarding utilization levels of hardware resources of the nodes of the distributed routing system, wherein the plurality of system managers includes at least a first system manager and a second system manager, the first system manager operates on the first node, the second system manager operates on the second node, and data indicating a current state of the distributed routing system includes the state data published by the applications and the state data published by the system managers;

determine, by the first system manager, based at least in part on (1) the state data published by the applications, (2) the state data published by the system managers, and (3) a set of rules for an application, an updated state of the distributed routing system, the application being in the plurality of applications, the updated state of the distributed routing system comprising an updated state of each of the nodes of the distributed routing system; and send updated state data to the second node, the updated state data indicating the updated state of the distributed routing system for each of the nodes of the distributed routing system, the first and second nodes being different ones of the plurality of nodes included in the distributed routing system; and wherein the instructions, when executed, configure the second system manager to:

responsive to receiving the updated state data, modify a state of the second node to conform to the updated state of the distributed routing system as indicated in the updated state data, wherein modifying the state of the second node comprises at least one of: starting the application on the second node, stopping the application on the second node, or modifying a state of the application on the second node.

\* \* \* \* \*

UNITED STATES PATENT AND TRADEMARK OFFICE
CERTIFICATE OF CORRECTION

PATENT NO. : 10,182,105 B2
APPLICATION NO. : 14/867325
DATED : January 15, 2019
INVENTOR(S) : Pramod Srinivasan et al.

Page 1 of 1

It is certified that error appears in the above-identified patent and that said Letters Patent is hereby corrected as shown below:

In the Claims

Column 31, Line 30 (Claim 13): Replace "system managers;" with --system managers; the first system manager is configured to:--

Column 31, Line 40 (Claim 13): Replace "send updated" with --the first node configured to send updated--

Signed and Sealed this
Eighth Day of September, 2020

Andrei Iancu
*Director of the United States Patent and Trademark Office*